US012731053B1

(12) United States Patent
Arifi

(10) Patent No.: US 12,731,053 B1
(45) Date of Patent: Sep. 8, 2026

(54) TESTING AND MONITORING ARTIFICIAL INTELLIGENCE AGENTS

(71) Applicant: Citibank, N.A., New York, NY (US)

(72) Inventor: Imir Arifi, Nashville, TN (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/571,342

(22) Filed: Mar. 18, 2026

(51) Int. Cl.
*G06N 5/04* (2023.01)
*G06F 16/3329* (2025.01)

(52) U.S. Cl.
CPC .......... *G06N 5/04* (2013.01); *G06F 16/3329* (2019.01)

(58) Field of Classification Search
CPC .......... G06N 5/04; G06N 3/045; G06N 3/047; G06N 5/022; G06N 3/08; G06N 20/00; G06N 20/10; G06N 20/20; G06F 16/3329; G06F 16/355; G06F 18/2178; G06F 11/3684; G06F 16/383; G06F 21/6245; H04M 3/5183; G06Q 40/03
See application file for complete search history.

(56) References Cited

U.S. PATENT DOCUMENTS 10,719,761 B2 * 7/2020 Shazeer ................. G06N 3/045
12,339,886 B1 * 6/2025 Jackson ................ G06F 16/383
12,380,340 B1 * 8/2025 Mamut .................. G06N 5/022
12,651,113 B1 * 6/2026 Agrawal ............... G06F 40/169
2018/0053119 A1 * 2/2018 Zeng ................... G06F 16/3329
2023/0376697 A1 * 11/2023 Chow ............... G06F 16/33295
2025/0077976 A1 * 3/2025 Drerup ................... G06N 20/00
2025/0124067 A1 * 4/2025 Qin ........................ G06F 16/338
2025/0209308 A1 * 6/2025 Namer .................. G06F 16/953
2025/0259041 A1 * 8/2025 Crabtree ................ G06N 3/047
2025/0322244 A1 * 10/2025 Mysore ............... G06F 11/3684
2025/0328560 A1 * 10/2025 Madisetti ........... G06F 16/3329
2026/0057039 A1 * 2/2026 Woods ................ G06F 18/2178
2026/0067335 A1 * 3/2026 Tran .................... G06F 21/6245
2026/0119998 A1 * 4/2026 Hartmann ............. G06N 3/045
2026/0127216 A1 * 5/2026 Ali ........................ G06F 16/355
2026/0148113 A1 * 5/2026 Brezis ...................... G06N 5/04

FOREIGN PATENT DOCUMENTS

CA 3150320 A1 * 3/2021 ............. G06N 3/048
CN 121659957 A * 3/2026 ............... G06N 3/02
CN 121833735 A * 4/2026 ............. G06N 3/006
JP 7659758 B2 * 4/2025 ............. G06Q 40/03
TW I917166 B * 3/2026

(Continued)

*Primary Examiner* — Steven P Sax

(74) *Attorney, Agent, or Firm* — Ashurst Perkins Coie US LLP

(57) ABSTRACT

Systems and methods are described herein for novel uses and/or improvements for determining malfunctions within undeployed artificial intelligence agents. A plurality of parameter combinations may be generated from parameters used to train an artificial intelligence agent. The plurality of parameter combinations may be used to generate a plurality of test requests. The plurality of test requests may be input into the undeployed artificial intelligence agent and one or more deployed artificial intelligence agents. The outputs of the agents may be compared to determine a context differential. The context differential may be used to determine one or more categories where the undeployed artificial intelligence agent's performance is deficient.

20 Claims, 20 Drawing Sheets

(56) References Cited

FOREIGN PATENT DOCUMENTS

| | | | | | |
|---|---|---|---|---|---|
| WO | WO-2024020107 | A1 * | 1/2024 | ............. | G06N 20/00 |
| WO | WO-2024077129 | A1 * | 4/2024 | ............. | G06N 5/022 |
| WO | WO-2025043184 | A2 * | 2/2025 | ............. | G06N 5/022 |
| WO | WO-2025178619 | A1 * | 8/2025 | ........... | G06N 3/0475 |
| WO | WO-2025245362 | A1 * | 11/2025 | ............. | G06N 3/092 |
| WO | WO-2025260078 | A1 * | 12/2025 | ........... | G06F 40/284 |
| WO | WO-2026050683 | A1 * | 3/2026 | ............. | G06F 21/62 |

* cited by examiner

| TimeStamp (203) | Airline (206) | Destination City (209) | Destination Country (212) | Request and Desired Response (215) |
|---|---|---|---|---|
| 2025-09-04-13:20 | DL | Douala | Cameroon | <Request, Response> |
| 2025-09-04-13:22 | AA | Luanda | Angola | <Request, Response> |
| 2025-09-04-13:24 | DL | Paris | France | <Request, Response> |
| 2025-09-04-13:26 | DL | Bengaluru | India | <Request, Response> |
| 2025-09-04-13:28 | UA | Yaounde | Cameroon | <Request, Response> |
| 2025-09-04-13:30 | DL | Yaounde | Cameroon | <Request, Response> |
| 2025-09-04-13:32 | DL | Luanda | Angola | <Request, Response> |
| 2025-09-04-13:30 | DL | Cebu | Phillipines | <Request, Response> |
| 2025-09-04-13:32 | UA | Jackson | United States | <Request, Response> |

*FIG. 2*

| Feature_IDs (303) | Feature_1 (306) | Feature_2 (309) | Feature_3 (312) |
|---|---|---|---|
| <Airline, City, Country> | DL | Yaounde | Cameroon |
| <Airline, City, Parameters> | DL | Paris | <Params_3> |
| <Airline, Country, Parameters> | UA | Cameroon | <Params_5> |
| <Airline, Country, Parameters> | DL | Cameroon | <Params_ 1> |
| <Airline, City, Country> | DL | Luanda | Angola |
| <City, Country, Parameters> | Yaounde | Cameroon | <Params_6> |
| <Airline, City, Country> | UA | Yaounde | Cameroon |
| <Airline, City, Country> | DL | Douala | Cameroon |

*FIG. 3*

| Request Category (503) | Control Response (506) | Test Response (509) | Deviation Value (512) | Categorical Deviation Value (515) |
|---|---|---|---|---|
| <Delta Flights to Yaounde> | [0.12, -0.34, 0.56, 0.78,...] | [-0.11, 0.23, -0.45, 0.67...] | 0.9 | 0.89 |
| <Delta Flights to Yaounde> | [0.05, 0.89, -0.23, 0.44,...] | [0.12, -0.56, 0.31, -0.77,...] | 0.3 | 0.89 |
| <Delta Flights to Yaounde> | [-0.41, 0.22, 0.63, -0.15,...] | [0.48, 0.09, -0.32, 0.54,...] | 0.01 | 0.89 |
| <Delta Flights> | [0.33, -0.12, 0.27, 0.91,...] | [-0.38, 0.60, 0.14, -0.25,...] | 0.01 | 0.09 |
| <Delta Flights> | [0.71, 0.03, -0.58, 0.1,...] | [0.42, -0.67, 0.28, 0.10,...] | 0.1 | 0.09 |
| <Delta Flights> | [-0.29, 0.55, 0.08, -0.61,...] | [0.36, 0.77, -0.13, 0.21,...] | 0.05 | 0.09 |
| <Flights to Yaounde> | [0.18, -0.49, 0.72, 0.05,...] | [-0.34, 0.62, 0.11, -0.80,...] | 0.87 | 0.03 |
| <Flights to Yaounde> | [0.64, 0.27, -0.31, 0.58,...] | [0.09, -0.42, 0.35, 0.47,...] | 0.9 | 0.03 |
| <Flights to Yaounde> | [-0.17, 0.42, 0.85, -0.29,...] | [0.33, -0.61, 0.24, 0.59,...] | 0.89 | 0.03 |

| Request: "Please find the best time in my calendar to book a flight under $1000 to Paris, France." | Sub-request payload |
|---|---|

1006 1008 1010

1004

| Sub_request | Category | Deficient? |
|---|---|---|
| "Retrieve calendar information" | Calendar_RAG | No |
| "Retrieve openings" | Calendar_assessment | No |
| "Select best opening to travel" | Calendar_reasoning | No |
| "Retrieve user flight preferences" | User_prefences | No |
| "Find airline schedules" | Flight_RAG | Yes |
| "Select flight that matches" | Flight_calendar_match | No |
| "Send suggested itinerary to user" | Itinerary_creation | No |

Modified Request: "Please find the best time in my calendar to book a flight FROM TABLE 1 under $1000 to Paris, France."

1102

| Flight Number | Airline | Destination | Date | Price |
|---|---|---|---|---|
| DL686 | DL | Paris, France | 11/01/2025 | $1201 |
| AA030 | AA | Paris, France | 11/01/2025 | $945 |
| DL205 | DL | Paris, France | 12/08/2025 | $1001 |
| DL607 | DL | Paris, France | 12/10/2025 | $786 |
| UA837 | UA | Paris, France | 12/10/2025 | $889 |
| DL280 | DL | Paris, France | 1/15/2025 | $909 |
| DL058 | DL | Paris, France | 1/15/2026 | $1028 |
| DL059 | DL | Paris, France | 1/17/2026 | $1124 |
| DL103 | UA | Paris, France | 1/17/2026 | $708 |

Modified Request: “Please find the best time in my calendar to book  DL607 on 12/10/2025 or UA103 on 1/17/2025.”

1152

| Flight Number | Airline | Destination | Date | Price |
|---|---|---|---|---|
| DL686 | DL | Paris, France | 11/01/2025 | $1201 |
| AA030 | AA | Paris, France | 11/01/2025 | $945 |
| DL205 | DL | Paris, France | 12/08/2025 | $1001 |
| DL607 | DL | Paris, France | 12/10/2025 | $786 |
| UA837 | UA | Paris, France | 12/10/2025 | $889 |
| DL280 | DL | Paris, France | 1/15/2025 | $909 |
| DL058 | DL | Paris, France | 1/15/2026 | $1028 |
| DL059 | DL | Paris, France | 1/17/2026 | $1124 |
| DL103 | UA | Paris, France | 1/17/2026 | $708 |

*FIG. 11B*

| Price (1303) | Airline (1306) | Destination City (1309) | Destination Country (1312) | Parameters (1315) |
|---|---|---|---|---|
| $1203 | DL | Douala | Cameroon | <Params_1> |
| $1320 | AA | Luanda | Angola | <Params_2> |
| $1090 | DL | Paris | France | <Params_3> |
| $1120 | DL | Bengaluru | India | <Params_4> |
| $1000 | UA | Yaounde | Cameroon | <Params_5> |
| $1098 | DL | Yaounde | Cameroon | <Params_6> |
| $1065 | DL | Luanda | Angola | <Params_7> |
| $1209 | DL | Cebu | Phillipines | <Params_8> |
| $1199 | UA | Jackson | United States | <Params_9> |

*FIG. 13A*

| Price (1353) | Airline (1356) | Destination City (1359) | Destination Country (1362) | Parameters (1365) |
|---|---|---|---|---|
| $1203 | DL | Jacksonville | United States | <Params_1> |
| $1320 | AA | Charlotte | United States | <Params_2> |
| $1090 | DL | Minneapolis | United States | <Params_3> |
| $1120 | DL | San Francsico | United States | <Params_4> |
| $1000 | UA | Toronto | Canada | <Params_5> |
| $1098 | DL | Charlotte | United States | <Params_6> |
| $1065 | DL | Tuscon | United States | <Params_7> |
| $1209 | DL | Jacksonville | United States | <Params_8> |
| $1199 | UA | Jackson | United States | <Params_9> |

*FIG. 13B*

| Price (1383) | Airline (1386) | Destination City (1389) | Destination Country (1392) | Parameters (1395) |
|---|---|---|---|---|
| $699 | DL | Jacksonville | United States | <Params_10> |
| $345 | DL | Charlotte | United States | <Params_11> |
| $479 | DL | Minneapolis | United States | <Params_12> |
| $387 | DL | San Francsico | United States | <Params_13> |
| $512 | AA | Toronto | Canada | <Params_14> |
| $289 | DL | Charlotte | United States | <Params_15> |
| $650 | DL | Tuscon | United States | <Params_16> |
| $450 | DL | Jacksonville | United States | <Params_17> |
| $1199 | AA | Jackson | United States | <Params_18> |

```
Agent_behavioral_profile {

     Agent_ID: {QAA_02840},

     proficient_categories: { [ [<category_1>,
          metadata_1, feature_payload_1],
          [<category_2>, metadata_2,
          feature_payload_2], [<category_3>,
          metadata_3, feature_payload_3]…] },

     deficient_categories: { [ [<category_4>,
          metadata_4, feature_payload_4],
          [<category_5>, metadata_5,
          feature_payload_5], [<category_6>,
          metadata_6, feature_payload_6]…] },

     specialized_agents: { [ [SAA_09372,
          [<category_4>, <category_6>] ],
          [SAA_00451, [<category_5>] ] ] },

}
```

TESTING AND MONITORING ARTIFICIAL INTELLIGENCE AGENTS

BACKGROUND

Artificial intelligence systems, particularly large language models (LLMs) and agentic artificial intelligence (AI) systems, have become increasingly prevalent in various applications ranging from customer service to content generation. These systems process natural language inputs, commonly referred to as prompts, to generate contextually appropriate responses. Key benefits of agentic AI systems include their ability to operate autonomously to achieve specific goals, which may contribute to completion of broader and more complex tasks. As such, each AI agent in an agentic AI system is configured to complete assigned tasks without malfunctioning. As these AI systems become more sophisticated and widely deployed, it becomes more important to ensure that they are thoroughly tested and patched, both before and after deployment. Existing testing mechanisms typically run agents through pre-defined test cases or evaluate outputs using human moderators. However, these approaches may fail to detect more sophisticated malfunctions in AI agents.

SUMMARY

In some instances, AI agents malfunction because the data they are trained on contains few training points in certain categories of information. However, in datasets that include thousands and even millions of categories, topics, etc., detecting specific categories or topics that cause AI agents to malfunction (e.g., perform a wrong operation, give inaccurate or anomalous output) may be extremely difficult. Furthermore, an AI agent may function well in response to prompts involving certain categories or topics, but when prompts combine those topics with other topics, the agent may provide inaccurate output or perform an undesired action. Accordingly, systems and methods are described herein for detecting malfunctions within artificial intelligence agents and addressing those malfunctions. A malfunction detection system may be used to perform operations for detecting malfunctions within artificial intelligence agents. Before an artificial intelligence agent is deployed, the malfunction detection system may start testing the AI agent by identifying the data features that were used to train the artificial intelligence agent to carry out certain operations. In particular, the malfunction detection system may determine a plurality of parameters used by an artificial intelligence agent to respond to requests. A request may be received from a user device or another suitable computing device in the form of a natural language prompt. In some implementations, the request may come from another AI agent that may have assigned a task to the artificial intelligence agent. The plurality of parameters may correspond to data that was used to train the artificial intelligence agent. For example, the parameters may correspond to sample requests such as "please find a time in my schedule to plan a trip to Rome, Italy" along with desired sample responses such as "June $9^{th}$-$15^{th}$ is the best time to travel to Rome, Italy, according to your calendar." In another example where reinforcement learning is used to train the artificial intelligence agent, parameters may correspond to a series of states, actions taken by the artificial intelligence agent in response to those states, and the rewards or penalties received for each action, as recorded during simulated interactions with users. In an example where the artificial intelligence agent is trained as a generative model, the parameters may correspond to sequences of natural language requests and responses, conversation histories, or partially completed prompts, which are used to train the artificial intelligence agent to generate contextually appropriate and coherent outputs based on the patterns learned from the interactions. In another example, parameters may correspond to feature data used to train the artificial intelligence agent, including feature identifiers such as "Airline" or "City" and feature data such as "Delta Airlines" or "Rome".

In some implementations, the artificial intelligence agent may be associated with a computer-executable operation set configured to be autonomously executed by the artificial intelligence agent on a software application set. In some implementations, the artificial intelligence agent may be associated with an operation set configured to be semi-autonomously executed using the artificial intelligence agent and human, user, or operator input on a software application set. The operation set may be a collection of predefined actions or functions that the artificial intelligence agent is authorized or enabled to perform within the software environment such as data retrieval, processing, or control operations. For example, the artificial intelligence agent may be associated with a capability to access a user's calendar, traveler ID number, and airline information or book travel reservations based on a user request.

The malfunction detection system may then create a set of different parameter combinations to use in testing the artificial intelligence agent. For example, the malfunction detection system may generate, based on the plurality of parameters, a plurality of parameter combinations for testing the artificial intelligence agent. The system may create an exhaustive or non-exhaustive set of all possible parameter combinations. In some implementations, the system may use an algorithm to determine which parameters to include in combinations. In some implementations, each of the plurality of parameter combinations may include a corresponding set of feature identifiers for features used to train the artificial intelligence agent. For example, the system may collect a subset of the training data along with labels associated with the subset of the training data and include both the labels and the associated training data in the set of parameter combinations.

The malfunction detection system may then use the parameter combinations to create requests for testing the artificial intelligence agent. Specifically, the malfunction detection system may generate, based on the plurality of parameter combinations, a plurality of test requests, which in particular may be different test requests, for the artificial intelligence agent. Each parameter combination may be adapted into a test request to be used to test the artificial intelligence agent. For example, a combination of parameters may include two sample requests such as "please find a time in my schedule to plan a trip to Rome, Italy" and "please book me a flight on Delta Airlines". The resulting test request may be "Please find a time in my schedule for a trip to Rome, Italy, and make travel reservations on Delta Airlines". In some implementations, each request of the plurality of test requests includes corresponding feature data for testing the artificial intelligence agent. For example, feature data may include identifiers of the categories of the parameters included in the test request, such as "<Airline, City, Country, Calendar>" or examples of data corresponding to each identifier, such as "Delta Airlines", "Rome", "Italy", or "Outlook". In some implementations, each test request may be associated with a corresponding category of a plurality of categories to be tested, such as "Delta Airlines flights" or "Outlook calendar availability retrieval". In continuing the above example, a request created from the three parameters may be associated with a category that includes the three parameters. For example, if the data for three features were "Delta Airlines", "Rome", and "Italy", then the associated category could be "Delta flights to Rome, Italy".

The malfunction detection system may then test the artificial intelligence agent using the test requests. In particular, the system may transmit the plurality of test requests to the artificial intelligence agent to obtain a plurality of test responses. For example, the system may provide these generated test requests to the artificial intelligence agent in the manner in which the agent would receive requests upon deployment to test how the agent would respond. In some implementations, the malfunction detection system may require a category associated with the responses so that the malfunction detection system is enabled to track which categories are being tested or for other applicable reasons. Accordingly, each test response of the plurality of test responses may be associated with the corresponding category of each test request. The test responses may take a variety of forms, including machine-generated text responses (e.g., when the agent includes a language model (e.g., large language model) that returns text), execution results or action outputs (e.g., when the agent conducts a specific operation, such as booking travel), or numerical or categorical decisions such as classifications, approvals, or denials, which may be received from agents and models that are not generative.

The malfunction detection system may also send the set of test requests to a deployed artificial intelligence agent to get control responses for comparison with the test responses. In particular, the system may transmit the plurality of test requests to one or more deployed artificial intelligence agents known to provide validated responses to the requests associated with a corresponding set of categories to obtain a plurality of control responses to the plurality of test requests. In some implementations, the one or more deployed artificial intelligence agents may be identified in a data repository and may be in wired or wireless communication with the system via one or more computing units (e.g., personal computing devices or servers). For example, the system may select an artificial intelligence agent that is already in use for responding to requests of a certain category or topic, and this deployed artificial intelligence agent may be known to provide answers or perform actions that have been tested and validated (e.g., validated answers within the category or topic). The system may send one or more of the generated test requests to the deployed agent to receive an output associated with the category or topic. This control response may be one of a plurality of control responses for each test request, where the control responses are known to be accurate.

The malfunction detection system may then use a machine learning model, which may be part of the system, to compare each control response with the test response generated from the same test request to determine contextual similarity of the responses. In particular, the system may determine, using a machine learning model for each pair of a control response and a test response, a corresponding context differential that indicates a deviation value between each test response and a corresponding control response. For example, the deviation value can be calculated based on how semantically similar the control response and the test response are by measuring the cosine similarity between vector embeddings of the responses, which may quantify how closely the meanings of the two outputs align in a high-dimensional semantic space. In some implementations, the machine learning model may be a model trained to measure similarities between outputs of AI agents, including natural language outputs, execution operations, or categorical outputs. Furthermore, the system may use a separate machine learning model for each possible type of output.

The malfunction detection system may then identify categories where the undeployed or deployed artificial intelligence agent is deficient based on the comparison with the responses from another (e.g., deployed) artificial intelligence agent. In particular, the system may determine, based on each context differential, one or more categories where a performance of the artificial intelligence agent is deficient. In some implementations, the performance may be considered to be deficient when a deviation value (e.g., a quantification of the deviation of the test response from the control response) meets a deviation threshold. In continuing the above example, the deployed artificial intelligence agent may have a deviation value of 0.8 for a particular category, such as "flights to Rome, Italy". The system may be configured to determine that the performance is deficient for deviation values higher than 0.5, so in this example, the category "flights to Rome, Italy" may be a category where the artificial intelligence agent is deficient. The system may determine a plurality of categories where the artificial intelligence agent is deficient, based on the combinations of parameters used to train the model. In some implementations, the malfunction detection system may determine categories where the performance of the artificial intelligence agent is inconsistent or unpredictable based on the context differentials. In particular, the system may determine, based on each context differential, a categorical deviation value associated with each category of the plurality of categories. For example, the system may use the difference between the highest deviation value for a test response within a certain category or topic and the lowest deviation value for a test response within the certain category or topic as the categorical deviation value. In some implementations, the system may determine, based on corresponding categorical deviation values, a set of categories including one or more unpredictable categories. The set of categories having the one or more unpredictable categories may include one or more corresponding categorical deviations meeting a categorical deviation threshold. As such, a category may have consistently high deviation values, meaning that the answers are consistently error-prone, and yet the category may be consistent or predictable. Categories that have both high and low deviation values may be more unpredictable.

In some implementations, the malfunction detection system may use the deviation values to help determine which parameter combinations do not result in deficient performance in order to downsize the number of combinations that need to be tested. In particular, the system may generate a first plurality of parameter combinations with a first number of parameters. The system may then, based on determining that a first deviation value corresponding to a first request associated with the first plurality of parameter combinations does not meet the deviation threshold, generate a second plurality of parameter combinations. Each parameter combination of the second plurality of parameter combinations may include one or more additional parameters. As such, the system may limit the number of parameter combinations to be tested.

In some implementations, upon determining that the artificial intelligence agent is deficient in one or more categories, the malfunction detection system may create synthetic data to retrain the artificial intelligence agent in those categories. In particular, based on determining the one or more categories where the artificial intelligence agent is deficient, the system may retrieve feature data corresponding to the one or more categories. The system may then use the feature data corresponding to the one or more categories to generate synthetic data for training the artificial intelligence agent in relation to the one or more categories. The synthetic data may include feature identifiers matching the feature data. For example, the synthetic data may fill in gaps in categories where the performance of the artificial intelligence agent is deficient, so that the agent may be retrained using the synthetic data. In some implementations, the system may, using the synthetic data, retrain one or more of the artificial intelligence agents or a deployed artificial intelligence agent tasked with monitoring the artificial intelligence agent. The system may then re-execute the testing operations to check whether the deficient categories have been addressed. In particular, the system may transmit a set of test requests corresponding to the one or more categories where the artificial intelligence agent is deficient to the one or more deployed artificial intelligence agents and to the artificial intelligence agent to obtain a second plurality of control responses and a second plurality of test responses that are associated with the one or more categories. The system may then generate, based on the second plurality of test responses and the second plurality of control responses, a second plurality of context differentials corresponding to the one or more categories and determine, based on the context differentials, that the artificial intelligence agent or the deployed artificial intelligence agent is no longer deficient with respect to a category of the one or more categories.

In some implementations, the malfunction detection system may create a behavioral profile for the artificial intelligence agent so that requests directed to deficient categories of the artificial intelligence agent may be modified or redirected, or so that deficient responses may be modified. In particular, the system may retrieve a list of the one or more categories where the artificial intelligence agent is deficient and generate a behavioral profile for the artificial intelligence agent including metadata associated with the one or more categories. For example, the metadata associated with the categories, e.g., the deficient categories, of the behavioral profile may include feature identifiers for training features that make up the category. In another example, the metadata may include an indication of a deployed artificial intelligence agent known to provide validated responses in the deficient category.

In some implementations, the malfunction detection system may test the artificial intelligence agent to determine whether, when given a request involving a deficient category, the artificial intelligence agent calls a deployed artificial intelligence agent to redirect or modify the request or the response. In particular, the system may retrieve, from the behavioral profile, the one or more categories where the artificial intelligence agent is deficient. The behavioral profile may indicate one or more deployed artificial intelligence agents for executing requests for the one or more categories. The system may then generate one or more test requests associated with each category of the one or more categories. For example, the system may generate test requests based on the deficient categories in the artificial intelligence agent's profile so that the system may examine the agent's behavior in each of those categories. In particular, the system may transmit, to the artificial intelligence agent, the plurality of test requests and determine whether the artificial intelligence agent uses the one or more deployed artificial intelligence agents to execute the one or more test requests. In some implementations, the artificial intelligence agent may use the one or more deployed artificial intelligence agents indicated in the behavioral profile to assist in generating a response in a deficient category of the artificial intelligence agent.

In some implementations, the malfunction detection system may also identify requests that may need to be modified or may need to be partially or fully executed by other agents. In particular, the malfunction detection system may receive a request for an artificial intelligence agent. The request may originate from a user of the system, another artificial intelligence agent, or another suitable requester. In some examples, the request may be in the form of a natural language request, for example "Please find the best time in my calendar to book a flight under $1000 to Paris, France." In some examples, the request may be in another form that is readable by the artificial intelligence agent, such as a structured data object (e.g., a JSON or XML file), an API call, a command-line instruction, or a machine-readable protocol message.

In some implementations, the system may determine a context of the request by identifying categories that are included in the request. In particular, the system may determine, based on the request, a request context that includes a plurality of categorical parameters associated with the request. For example, the system may use a machine learning model, an artificial intelligence model, or another suitable method to parse the request to extract contextual details from the request, such as identifying that the user wishes to travel to Paris, that the user wishes to travel for under $1000, and/or that the user wishes for the agent to access their calendar to identify a time window for traveling to Paris, in continuing the example above. In some implementations, the plurality of categorical parameters may indicate one or more categories associated with the request, for example "Calendar information", "Flights to Paris", or "Flights under $1000". The categories may be defined according to subject matter domains, functional tasks, or types of information referenced in the request. In some implementations, each category of the one or more categories may be associated with a corresponding reasoning domain area of a plurality of reasoning domain areas. For example, the artificial intelligence agent may be trained to reason in a specific set of areas, such as reasoning to identify available times in a calendar or to find the best flight tickets under $1000. In some examples, each reasoning domain area may correspond to a category included in a behavioral profile of an artificial intelligence agent that can identify that they may be equipped to reason in domain areas corresponding to each category.

In some implementations, the system may use the behavioral profile for the artificial intelligence agent to determine which, if any, of the categories of the request are outside of the agent's reasoning capabilities. In particular, the system may compare, using a first machine learning model, a behavioral profile associated with the artificial intelligence agent with the plurality of categorical parameters associated with the request to obtain one or more deficient categories associated with the request. For example, a behavioral profile may be a data structure such as a table or file that includes deficient categories of an artificial intelligence agent, proficient categories of an artificial intelligence agent, or other information about the reasoning capabilities of an AI agent. In some implementations, the one or more deficient categories of the request may correspond to one or more reasoning domain areas where an output of the artificial intelligence agent is known to have an agent output metric (e.g., an accuracy metric) not satisfying (e.g., below) a threshold. For example, if the artificial intelligence agent has been trained to book trips, but it is asked to schedule a meeting between multiple people with different calendars, a category such as "identify calendar overlaps" may be outside of the domain areas of the artificial intelligence agent and, as such, the artificial intelligence agent may generate low-accuracy responses to such requests. As such, the example category would be labeled as a "deficient" category of a request.

In some implementations, the system may, based on obtaining the one or more deficient categories of the request, determine a first domain-specific agent of a plurality of domain-specific artificial intelligence agents. For example, the domain-specific agent may have a behavioral profile listing its proficient categories associated with its proficient reasoning domain areas, which may include deficient categories of the artificial intelligence agent undergoing testing. In some implementations, the first domain-specific agent may be known to provide valid responses in a subset of the deficient categories of the artificial intelligence agent. For example, the first domain-specific agent may have undergone a testing process which validated the first domain-specific agent's responses in the deficient categories of the artificial intelligence agent before adding the deficient categories to a behavioral profile associated with the first domain-specific agent. In some examples, the system may have access to a plurality of domain-specific agents with reasoning capabilities corresponding to different reasoning domain areas. The system may select the domain-specific agent with reasoning capabilities (e.g., capabilities listed in a behavioral profile of such domain-specific agent) aligning with the deficient categories included in the request.

In some implementations, the system may take the part of the request that is associated with the deficient categories of the artificial intelligence agent, adjust it so that it is readable by another artificial intelligence agent, and send that portion to the first domain-specific agent to process. In particular, the system may modify, based on a reasoning domain area associated with a deficient category of the one or more deficient categories, a first portion of the request to be executed by the first domain-specific agent. For example, if a request says, "Please find an overlapping time in my family's calendar to book a trip to Paris, France under $1000", the system may take the part of the request that says "Please find an overlapping time in my family's calendar" and transmit that part to the first domain-specific agent. In some implementations, the first portion of the request may include a portion of the request related to the reasoning domain area associated with the deficient category. In continuing the above example, finding an overlapping time across calendars may be outside the reasoning domain areas of the artificial intelligence agent undergoing testing, so the request may fall into a deficient category of the artificial intelligence agent. As such, that part of the request may be sent to the first domain-specific agent for execution.

In some implementations, the system may create a new request by taking the response from the domain-specific agent to the part of the request and inserting it into the original request. In particular, the system may generate a modified request including a domain-specific response from the first domain-specific agent as a replacement for the first portion of the request. The modification of the response may further include natural language processing (e.g., a template-based approach, context-aware text generation, or semantic parsing) or another method of adding the response into the request to replace the first portion in a manner that renders the request readable by the artificial intelligence agent undergoing testing. For example, the system may update a structured data object, such as a JSON or XML file, by replacing or populating specific fields or nodes with the response from the domain-specific agent. In some cases, the system may generate or modify an API request, a protocol buffer message, or another machine-readable format by programmatically inserting the response data from the domain-specific agent, e.g., the first domain-specific agent as in the example described, into the appropriate parameter, attribute, or key-value pair. In general, the modified request may conform to the expected schema or data structure required by the artificial intelligence agent for further processing.

In some implementations, the system may cause the modified request to be executed by the artificial intelligence agent, for example, by transmitting the modified request to the artificial intelligence agent for execution.

In some implementations, modifying a portion of the request may include generating sub-requests to transmit to the domain-specific agent to obtain responses in the reasoning domain areas associated with the deficient categories of the request. In particular, the system may, using the one or more deficient categories associated with the request, generate one or more sub-requests comprising one or more portions of the request, with each portion corresponding to the deficient category of the one or more deficient categories. For example, if the first domain-specific agent processes the "Please find an overlapping time in my family's calendar" portion of the above example, the corresponding sub-request could be "Find an overlapping free time of at least one week in the calendar of the account users." The sub-requests may be in a format readable by the domain-specific agents. In some implementations, a first sub-request of the one or more sub-requests comprises the first portion of the request, and other sub-requests comprise other portions of the request. For example, if a request corresponded to multiple deficient categories, multiple sub-requests could be generated from the original request. The sub-request(s) may then be transmitted to the domain-specific agents to be processed, where each domain-specific agent may handle sub-requests within their reasoning domain, and in some examples the sub-requests may be associated with metadata indicating corresponding categories or other suitable information. In some examples, once the artificial intelligence agent has executed the modified request, which includes one or more responses to the sub requests, the system may assess the accuracy of the response to the modified request.

In some implementations, the system may detect or determine that a response to a modified request suggests that the artificial intelligence model has executed the modified request with a degree of bias. The system may check that the bias is of a desired type. In particular, the system may receive a response to the modified request executed by the artificial intelligence agent and determine, using a context similarity machine learning model, whether a response context of the response matches one or more bias contexts retrieved from a bias database. For example, the bias database may include biases with contexts such as "preference for a particular airline" or "preference for a particular day of the week." The context similarity machine learning model may be trained to measure the degree of context similarity between a particular bias context from the bias database and a particular response. In this manner, if the response indicates a preference for a certain airline, the system may conclude that the response context matches a bias context from the bias database. Based on determining that the response context matches a bias context from the bias database, the system may generate an indication of a bias detected within the response. The system may check a user behavioral profile to determine whether the bias detected aligns with the profile. In particular, the system may receive a user behavioral profile associated with a user that generated the request and determine whether the bias detected within the response matches a user-preferred bias within the user behavioral profile. For example, if a user is a rewards member of a certain airline, the user behavioral profile may indicate that the user typically prefers to fly on the certain airline. As such, the system may determine that the bias of the agent, such as "preference for a particular airline", matches a user-preferred bias.

In some implementations, the system may determine that a response from an artificial intelligence agent is deficient. The response may correspond to a request sent to the artificial intelligence agent. In some implementations, the response is deficient if the request is associated with one or more deficient categories. For example, an artificial intelligence agent may receive a request that corresponds or has at least a portion that corresponds to one or more deficient categories of the artificial intelligence agent. If the artificial intelligence agent executes a request that corresponds or has at least a portion that corresponds to deficient categories (e.g., as denoted in a behavioral profile of the artificial intelligence agent) and generates a response (e.g., without sending a portion of the request to a domain-specific agent), the system may decide that the response is deficient.

In some implementations, determining that the response from the artificial intelligence agent is deficient may include receiving a trigger event associated with the response received from the artificial intelligence agent. The trigger event could be a user flagging the response as incorrect or unsatisfactory, a detection of an inclusion in the response of an indication that the request pertains to a deficient category of the artificial intelligence agent, a result of a randomized test, or another suitable trigger. The system may receive (e.g., responsive to the trigger event) a second response to the request executed by a domain-specific artificial intelligence agent, wherein the domain-specific artificial intelligence agent uses the second plurality of parameters to execute the request. The system may determine, using a machine learning model, a context deviation value based on the response and the second response. The context deviation value may indicate a deviation between the response and the second response. Based on determining that the context deviation value exceeds a predetermined deviation threshold, the system may determine that the response from the artificial intelligence agent is deficient.

Responsive to determining that the response is deficient, the system may identify a first plurality of parameters used by the artificial intelligence agent to respond to the request, wherein the first plurality of parameters corresponds to a set of features within a first dataset with first feature data, and wherein the first dataset was used in training the artificial intelligence agent in one or more categories corresponding to the request. The parameters may correspond to sequences of natural language requests and responses, conversation histories, or partially completed prompts, which are used to train the artificial intelligence agent to generate contextually appropriate and coherent outputs based on the patterns learned from the interactions. In another example, parameters may correspond to feature data used to train the artificial intelligence agent, including feature identifiers.

In some implementations, the system may identify a second plurality of parameters corresponding to the set of features within a second dataset, the set of features having second feature data different than the first feature data. For example, the second dataset may contain the same features as the training data but may contain different feature data. In some implementations, the feature data may include the same labels or numbers but in a different distribution than the first dataset. For example, the second dataset may include feature data that was collected after the first feature data, so the second feature data is "newer" than the first feature data, suggesting a more current data distribution than the first feature data. Additionally or alternatively to a dataset capturing a different time, the second dataset may capture a data distribution reflecting a different or "shifted" population, where the underlying user base, demographic group, geographic region, or market segment represented in the data differs from that of the first dataset. Such population shifts may introduce new trends, behaviors, or feature correlations that were not present or prevalent in the original training data, thereby impacting the performance of the artificial intelligence agent.

The system may detect, based on comparing the first plurality of parameters with the second plurality of parameters, a data drift between the first dataset and the second dataset. The data drift may indicate that the first feature data corresponding to one or more features of the set of features within the first dataset has a different statistical distribution than the second feature data corresponding to the one or more features of the set of features within the second dataset. For example, the system may detect a qualitative difference in categorical features or a quantitative difference in numerical features.

If the system detects a data drift, the system may identify the features that have drifted and retrieve them from the second dataset. In particular, based on detecting the data drift, the system may retrieve from the second dataset a portion of the second feature data corresponding to the one or more features that have the different statistical distribution than the first feature data corresponding to one or more features of the set of features within the first dataset. In some implementations, the portion of the second feature data may be a proportion of the second feature data less than the whole, while in some implementations, this portion may be a retrieval of the entire dataset of the second feature data.

The system may retrain, using the portion of the second feature data within the second dataset, the artificial intelligence agent to no longer be deficient in the request category. In some implementations, if the system detects data drift on a large enough scale, the system may retrain the artificial intelligence agent using the second dataset (e.g., in its entirety). In particular, based on the drift metric exceeding a threshold, the system may retrain the artificial intelligence agent in the plurality of request categories using the second plurality of parameters. In some implementations, if the data drift does not exceed the threshold, the system may retrain a part of the artificial intelligence agent (e.g., a proportion of the features less than the whole) using the corresponding part of the second feature data.

In some implementations the system may, based on a plurality of parameter combinations of parameters used by an artificial intelligence agent to respond to requests, generate a plurality of test requests for the artificial intelligence agent. The artificial intelligence agent may use the parameters by incorporating them as training data during model development or fine-tuning, leveraging them as retrieval keys or context sources for retrieval-augmented generation (RAG), or directly applying them as the operational parameters that may define the agent's architecture and/or inference behavior. The system may use combinations of these parameters to generate the test requests. Each test request may be associated with one or more corresponding categories of a plurality of categories to be tested.

In some implementations, the system may determine a plurality of deficient categories based on a plurality of test responses to the plurality of test requests. The deficient categories can be categories where a performance of the artificial intelligence agent is deficient (e.g., where a behavioral profile indicates that the artificial intelligence agent is deficient in the categories, or where a deviation value of a test response meets a deviation threshold). In some implementations, each deficient category may be associated with a corresponding subset of the parameters used by the artificial intelligence agent.

In some implementations, the system may train a set of specialized artificial intelligence agents for responding to the requests associated with the plurality of deficient categories. The system may generate a plurality of training sets (e.g., a plurality of unique training sets) for training the specialized artificial intelligence agents, wherein each training set of the plurality of training sets comprises the number of corresponding subsets of the parameters used by the artificial intelligence agent. The system may train the set of specialized artificial intelligence agents based on the plurality of training sets. In some implementations, the training sets may be associated with certain deficient categories of the artificial intelligence agent.

In some implementations, the system may transmit a second plurality of test requests to each specialized artificial intelligence agent of the set of specialized artificial intelligence agents to determine one or more specialized artificial intelligence agents that are not deficient in at least one subset of the plurality of deficient categories. For example, the system may use responses of the specialized artificial intelligence agents to the test for categories where the specialized artificial intelligence agents are deficient. Categories where each specialized artificial intelligence agent is not found to be deficient may include a subset of the plurality of deficient categories. In some implementations, each test request of the second plurality of test requests may correspond to a deficient category of the plurality of deficient categories.

Based on a second plurality of test responses to the second plurality of test requests, the system may select (1) a first specialized artificial intelligence agent of the set of specialized artificial intelligence agents to respond to the requests associated with a first set of the plurality of deficient categories and (2) a second specialized artificial intelligence agent of the set of specialized artificial intelligence agents to respond to the requests associated with a second set of the plurality of deficient categories. In some implementations, the first and the second sets of the plurality of deficient categories are different, while in some implementations, they are the same. In some examples, both the first and the second specialized artificial intelligence agents may be proficient in some of the categories. The specialized artificial intelligence agents may then be assigned to respond to requests associated with their respective proficient categories.

In some implementations, the system may generate a configuration for the artificial intelligence agent that indicates that the first specialized artificial intelligence agent be used for the first set of the plurality of deficient categories and that the second specialized artificial intelligence agent be used for the second set of the plurality of deficient categories. For example, the system may create or add to a behavioral profile of the artificial intelligence agent indicating that the agent should use the specialized agents (e.g., a certain specialized agent) for responding to requests corresponding to associated deficient categories of the plurality of deficient categories.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a possible excerpt of a training data structure for malfunction detection, in accordance with one or more implementations.

FIG. 3 illustrates a possible data structure of parameter combinations, in accordance with one or more implementations.

FIG. 5 illustrates a data structure including example context differentials, in accordance with one or more implementations.

FIG. 10 illustrates a possible structure for requests and sub-requests, in accordance with one or more implementations.

FIG. 11A and FIG. 11B illustrate another possible structure for requests and sub-requests, in accordance with one or more implementations.

FIG. 13A illustrates a possible data structure for storing a plurality of parameters, in accordance with one or more implementations.

FIG. 13B illustrates a possible data drift in a data structure, in accordance with one or more implementations.

FIG. 13C illustrates another possible data drift in a data structure, in accordance with one or more implementations.

FIG. 15 shows an exemplary configuration for an artificial intelligence agent for bagging errors with specialized artificial intelligence agents, in accordance with one or more implementations.

DETAILED DESCRIPTION

Figure 1:
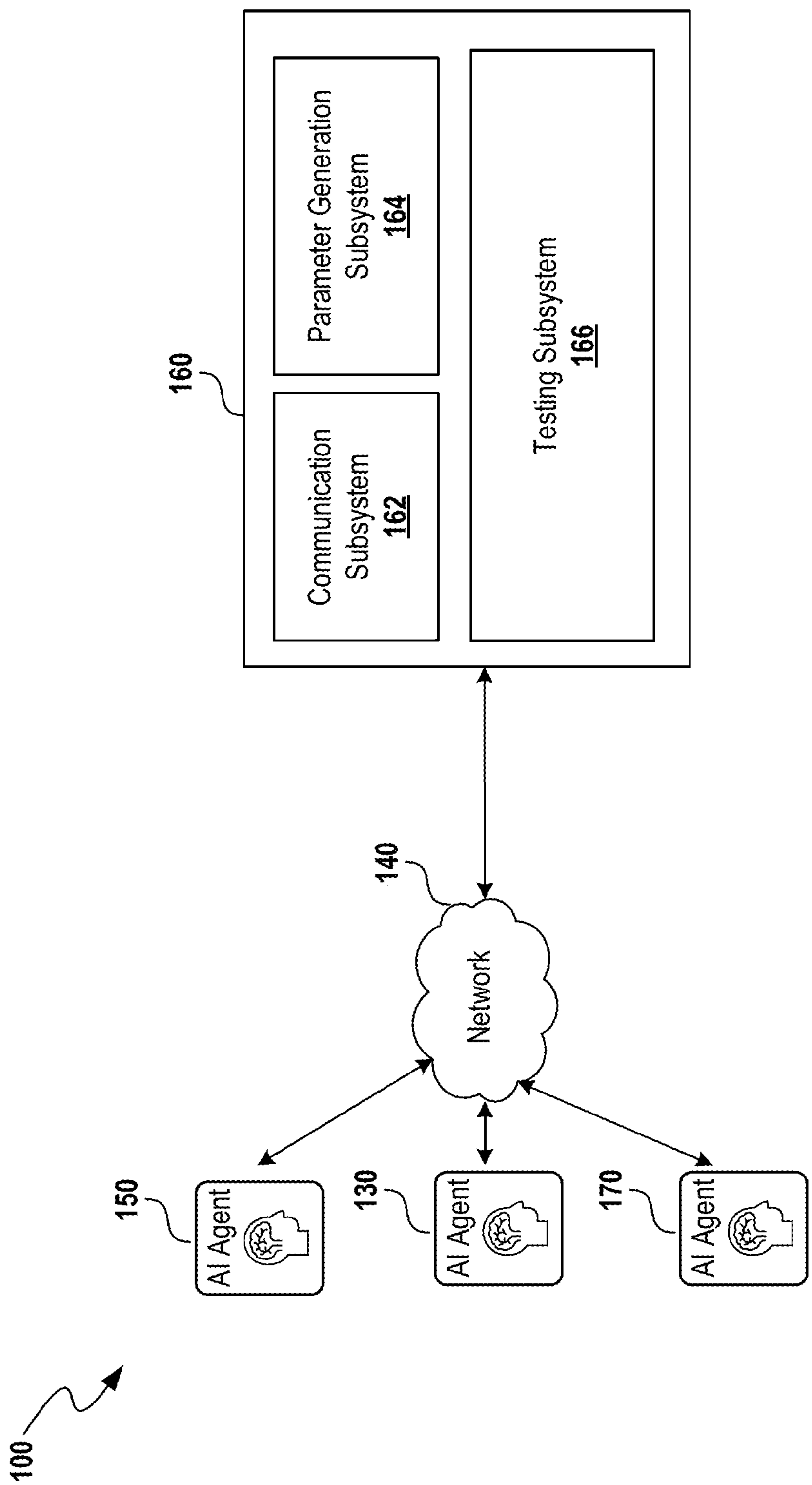
FIG. 1 shows an illustrative system for detecting malfunctions within undeployed artificial intelligence agents, in accordance with one or more implementations.

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other cases, well-known structures and devices are shown in block diagram form in order to avoid unnecessarily obscuring the implementations of the invention.

The malfunction detection system enables testing of an artificial intelligence agent prior to deployment. Although testing is described as being performed prior to deployment, the testing described herein may be performed after deployment. The system may systematically generate and execute test requests by creating combinations of parameters used to train the artificial intelligence agent and creating test requests based on these combinations, covering plausible requests that could be submitted to the agent upon deployment. The agent's responses to the test requests may be compared against validated responses from deployed artificial intelligence agents, using a machine learning model or another tool to quantify the deviation between the outputs. The system may analyze these deviations across operational categories, identifying areas where the undeployed agent's performance may be deficient or unpredictable.

An artificial intelligence agent or artificial intelligence model may be a statistical or machine-learning model (e.g., linear or logistic regression, decision tree, random forest, gradient-boosted model), a neural network (e.g., feedforward, convolutional, recurrent, LSTM, GRU), a transformer-based model (e.g., encoder, decoder, or encoder-decoder architecture), a large language model, a multimodal model (processing any combination of text, images, audio, video, code, or sensor data), a foundation model or fine-tuned derivative, a retrieval-augmented generation system, a rules-based or expert system, a probabilistic graphical model (e.g., Bayesian network, Markov model), a reinforcement learning policy or value function (e.g., actor-critic, Q-learning), a planning or search-based system (e.g., MCTS, symbolic planner), a hybrid neuro-symbolic system, a finite-state machine or stateful policy, a generative model (e.g., GAN, VAE, diffusion model), an online-learning or continual-learning system, a bandit or active-learning policy, a constraint-satisfaction or optimization engine (e.g., MILP, heuristic, metaheuristic), a program-synthesis or code-generation model, a tool-using or tool-augmented model, an autonomous software agent capable of perceiving inputs, forming internal state, selecting actions, and affecting digital or physical environments, a task-oriented conversational agent or assistant, an orchestration framework that coordinates multiple models or tools (e.g., multi-agent system, agentic workflow), a policy-governed or guardrail-constrained service, an edge-deployed model or embedded controller, a cloud API or containerized service exposing model inference, or any combination, pipeline, ensemble, or hierarchy of the foregoing configured to perceive, reason, predict, decide, generate, or act. For example, an artificial intelligence agent or artificial intelligence model may be a machine learning model as described with reference to FIG. 7 or a transformer model as described with reference to FIG. 8.

FIG. 1 is an example of an environment 100 for detecting malfunctions within undeployed artificial intelligence agents. Environment 100 may include multiple artificial intelligence (AI) agents (e.g., AI agent 130, 150, and 170) that may communicate with a malfunction detection system 160 through a network 140. Malfunction detection system 160 may use AI agents when testing undeployed or deployed AI agents (e.g., AI agent 130, 150, or 170) to identify malfunctioning undeployed AI agents. Each communication session may include a plurality of requests and a plurality of responses from an artificial intelligence agent.

In some implementations, network 140 may facilitate secure and reliable communication between the AI agents and malfunction detection system 160. Network 140 may include various networking infrastructure components such as routers, switches, firewalls, and load balancers that may ensure proper data routing and security enforcement. Network 140 may support multiple communication protocols and may provide redundancy and fault tolerance to maintain system availability. In some implementations, network 140 may be a local area network, a wide area network (e.g., the internet) or a combination of both.

In some implementations, the undeployed artificial intelligence agent may be associated with a corresponding computer-executable operation set configured to be autonomously executed by the artificial intelligence agent on a software application set. For example, the malfunction detection system 160 may establish secure communication channels with each client device, log all incoming requests and outgoing responses, and maintain session state information to track conversation flow and context over time. Each artificial intelligence agent may perform assigned tasks by processing natural language or other types of inputs through sophisticated neural network architectures, such as transformers or large language models. These components may enable an AI agent to identify user intent and generate contextually appropriate responses.

In some implementations, AI agents may operate by converting textual prompts into numerical representations, applying learned parameters and weights to analyze the semantic meaning, and then generating outputs that align with their training objectives and operational constraints. The AI agents may execute their computer-executable operation sets by interfacing with various software applications through application programming interfaces (APIs), database connections, or direct system calls to perform actions such as data retrieval, content generation, or automated decision-making. In some implementations, the AI agents may continuously adapt their behavior based on ongoing interactions, utilizing reinforcement learning mechanisms or fine-tuning processes to improve their performance and maintain alignment with user expectations and safety protocols.

Malfunction detection system 160 may include specialized subsystems designed to handle different aspects of training, testing and retraining AI agents. In some implementations, a communication subsystem 162 may manage the flow of data between the AI agents (e.g., AI agent 130, 150, or 170) and other components of malfunction detection system 160. Communication subsystem 162 may handle protocol translation, message routing, and session management to ensure reliable communication across network 140. In some implementations, a parameter generation subsystem 164 may create combinations of parameters to be used in testing the undeployed (or deployed) AI agent or may be used in generating synthetic data. A testing subsystem 166 may create test requests from parameter combinations and determine context differentials between responses from the undeployed AI agent and one or more deployed AI agents. For example, parameter generation subsystem 164 may generate combinations of parameters, and testing subsystem 166 may use these combinations of parameters to create test requests for testing the undeployed AI agent.

The malfunction detection system may determine a plurality of parameters used by an artificial intelligence agent to respond to requests. A request may come from a user, in the form of a natural language prompt, may come from another AI agent who has assigned a task to the artificial intelligence agent, or may originate somewhere else. The plurality of parameters may correspond to data that was used to train the artificial intelligence agent. The parameters used to train the artificial intelligence agent may include data, for example, zip codes, names, or records, and a set of features, which may be extracted from the data. The features may be numerical, categorical, textual, or other formats. In some implementations, the artificial intelligence agent is associated with a computer-executable operation set configured to be autonomously executed by the artificial intelligence agent on a software application set. Each function within the computer-readable operation set may be designed to perform a targeted task or process relevant to the agent's domain. For example, the agent may be tasked with responding to a query, classifying an input, recommending an action, or executing a workflow. These functions may be intended to carry out their designated operational purpose, so that the artificial intelligence agent performs functions within its domain.

In some implementations, the system may determine the plurality of parameters by identifying a preexisting set of parameters which includes the plurality of parameters. For example, the preexisting set of parameters may be stored in a database accessible by a system, and/or managed by a system operator or trainer of the artificial intelligence agent. For example, the system may query a model registry, experiment-tracking platform, or feature store (e.g., training configuration files, hyperparameter logs, feature schemas, tokenizer vocabularies, prompt templates, reward-model checkpoints, and data lineage metadata) to retrieve the parameters associated with a specific model version or deployment. In some implementations, determining the plurality of parameters may include transmitting requests or prompts to the artificial intelligence agent to determine how the artificial intelligence agent was trained based on the agent's responses to the requests or prompts. The plurality of parameters may be determined or generated based on information collected based on the agent's responses. For example, the system may administer structured probe prompts and ablation-style tests (e.g., controlled substitutions of entities, attributes, or contexts) to elicit output variations, infer salient features and prompt patterns, and reconstruct approximate training parameter distributions (such as frequently observed feature values, response formats, tool-calling schemas, and decision thresholds) from the agent's behavioral signatures.

FIG. 2 illustrates a possible excerpt of a training data structure for malfunction detection, in accordance with one or more implementations. An artificial intelligence agent (e.g., AI agent 150, 130, or 170) may transmit the training data structure to malfunction detection system 160. In some implementations, the artificial intelligence agent may be associated with a third party (e.g., a customer service agent). Communication subsystem 162 may pass the training data, or a pointer to the training data in memory, to parameter generation subsystem 164. Parameter generation subsystem 164 may include software components, hardware components, or a combination of both. For example, parameter generation subsystem 164 may include software components (e.g., application programming interface (API) calls) that access one or more machine learning models. Parameter generation subsystem 164 may use the training data to generate synthetic data or to create combinations of parameters for testing the undeployed artificial intelligence agent. For example, parameter generation subsystem 164 may generate combinations of parameters using training data or create synthetic data points within features of the training data. In some implementations, malfunction detection system 160 may receive training data from sources other than an AI agent.

The data structure of FIG. 2 illustrates an example of data that may be used to train an AI agent. For example, users, third parties, or other AI agents may request travel-booking services from an AI agent tasked with booking trips, and the data structure may store parameters associated with these requests. Fields 203 through 212 may store metadata associated with categories of requests. For example, field 203 may store a timestamp associated with a time when a query originated, while field 206 may store other data corresponding with an airline feature, field 209 may store data corresponding with a destination city feature, and field 212 may store data corresponding with a destination country feature. Field 215 may store data corresponding with a sample request and a sample desired response used for training the artificial intelligence agent. For example, the data may be a payload which includes a sample request such as "please find a time in my schedule to plan a trip to Rome, Italy" or "please book me a Delta Airlines flight to Douala, Cameroon", and a desired response such as "June $9^{th}$-$15^{th}$ is the best time to travel to Rome, Italy, according to your calendar" or "I have booked DL6789 to Douala, Cameroon, on October $20^{th}$" The feature data along with the sample request may be used to define an objective for training the artificial intelligence model, and the desired response may serve as a target output or label for supervised learning. In some examples of artificial intelligence training, such as supervised learning, the artificial intelligence agent may "learn" to map sample requests to desired outputs by minimizing the difference between predictions and the actual target responses provided in the dataset. As such, the data structure may store the request, response, and the associated features and other metadata. For example, a data structure such as the data structure of FIG. 2 may include additional columns with other types of information that may be useful in training the artificial intelligence agent, such as user-specific parameters like user preferences, budget constraints, or special requirements.

In some implementations, as an alternative to supervised learning with desired responses included in the data structure, the model may use techniques such as reinforcement learning, where the model receives feedback for responses in the form of rewards or penalties instead of ingesting and learning desired responses. A data structure may also store "masked" requests, where parts of the request are redacted, and the model may be trained to predict the masked parts of the request based on the underlying distribution of the training data. Predicting words and learning language patterns are training methods commonly used for training artificial intelligence models.

Another example of data that could be used to train an AI agent relates to banking applications. Requests to specific AI agents may involve user-specific context or personalization so the corresponding data structure may store training data including features such as user identifiers, transaction information, or other task-specific features.

In some implementations, malfunction detection system 160 may generate, based on the plurality of parameters, a plurality of parameter combinations for testing the artificial intelligence agent. For example, parameter generation subsystem 164 may create an exhaustive or non-exhaustive set of all possible parameter combinations. For example, parameter generation subsystem 164 may employ methods such as exhaustive search (full factorial design), grid search, or random sampling (Monte Carlo sampling) to generate parameter combinations. These approaches allow the subsystem to systematically or probabilistically create sets of parameter values covering the feature space. In some implementations, each of the plurality of parameter combinations may include a corresponding set of feature identifiers for features used to train the artificial intelligence agent. For example, the system may collect a subset of the training data along with the labels associated with the subset of the data and include both the labels and the data in the set of parameter combinations.

FIG. 3 illustrates a possible data structure of parameter combinations, in accordance with one or more implementations. In this example illustration, the system has generated combinations of 3 parameters from the training data. Parameter generation subsystem 164 may generate parameter combinations such as those contained in the rows of the data structure, for example. Field 303 may store data corresponding with feature identifiers of features included in the associated parameter combinations. In one example, the parameter combinations may be generated based on features, where Field 303 may store feature identifiers "<Airline, City, Country>" along with three datapoints that fall within the features "Airline" of field 206, "Destination City" of field 209, and "Destination Country" of field 212. This particular combination of parameters may have been generated by parameter generation subsystem 164 using one of the methods outlined above. Field 306 may store a first feature, labeled here as "Feature_1", field 309 may store a second feature, labeled here as "Feature_2", and field 312 may store a third feature, labeled here as "Feature_3". The data contained within each field may be data points from the training data set, such as the data structure shown in FIG. 2, may come from another related data set, or may be synthetic data points generated by parameter generation subsystem 164. In another example, the combination of parameters may include requests corresponding to features. For example, for a feature combination including "<Calendar Retrieval, City, Airline>", the system could combine prompts such as "please find a time in my schedule for a week-long trip", "please plan a trip to Rome, Italy", and "please book me a flight on Delta Airlines". In still another example, the system may not consider features and instead create parameter combinations of requests alone, combining multiple prompts to create sample test prompts such as "plan a week-long trip to Rome, Italy, on Delta Airlines."

In some implementations, the malfunction detection system 160 may generate, based on the plurality of parameter combinations, a plurality of test requests for the artificial intelligence agent. Each parameter combination may be adapted into a request to be used to test the artificial intelligence agent. For example, testing subsystem 166 may generate the test request using one or more machine learning models, using an AI agent, or using another suitable method. A test request may take the form of a data structure, prompt, or another form that is suitable to be processed by the AI agent. In some implementations, each test request may include information regarding the agent intended to process the request, the agent (or other party) who initiated the request, and/or other suitable information. In some implementations, each request of the plurality of test requests may include corresponding feature data for testing the artificial intelligence agent. For example, the system may use a combination of three parameters to integrate data associated with the three parameters into a single request to test the artificial intelligence agent on a request involving those three parameters. In some implementations, each test request may be associated with a corresponding category of a plurality of categories to be tested. For example, the category may include the feature identifiers corresponding with the parameter combination used to generate the test request or may be derived from and/or include the datapoints of the parameter combination.

Figure 4:
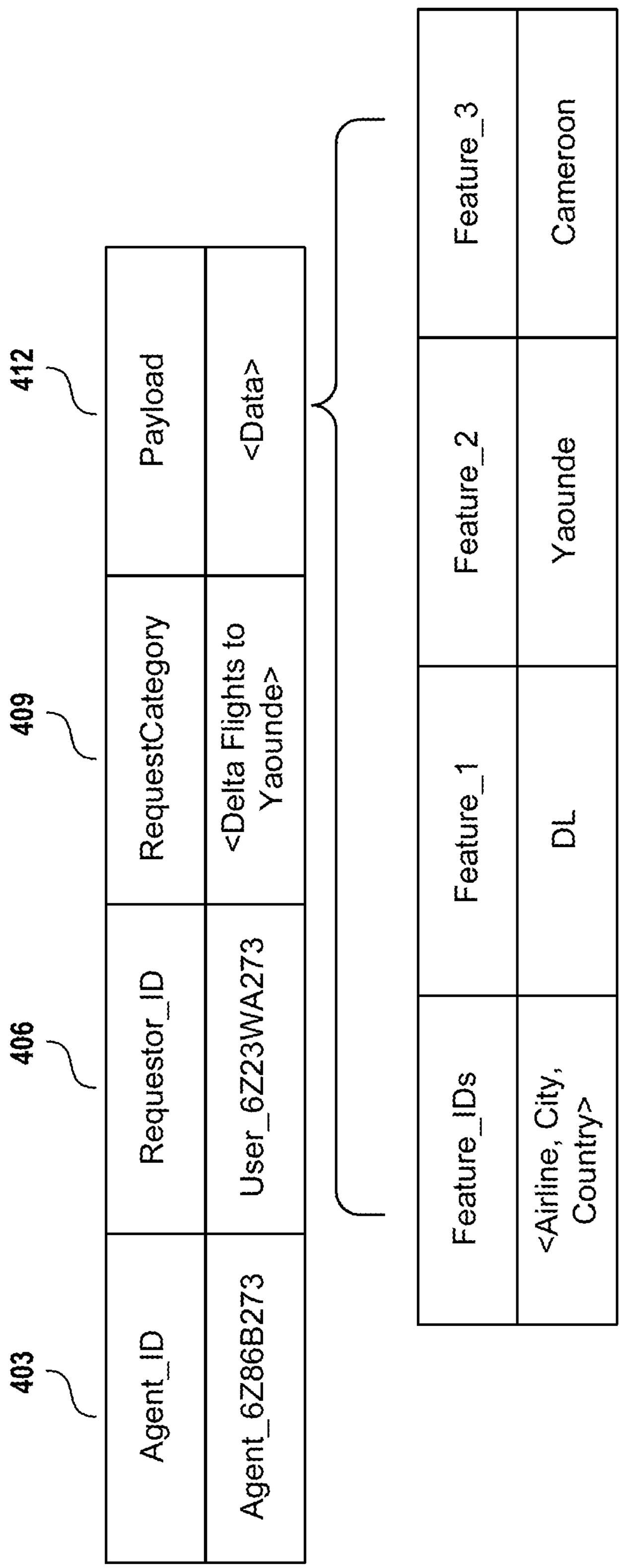
FIG. 4 illustrates an excerpt of an example data structure of a test request, in accordance with one or more implementations.

FIG. 4 illustrates an excerpt of an example data structure of a test request, in accordance with one or more implementations. In this example, the test request takes the form of a data structure, but test requests may take other suitable forms. Field 403 of the data structure of FIG. 4 includes an "Agent ID" feature with associated data identifying an artificial intelligence agent. For example, the artificial intelligence agent may be the undeployed artificial intelligence agent intended to process the test request, or may be a deployed artificial intelligence agent intended to process the test request. Field 406 includes a "Requestor_ID" feature with associated data. The requestor may identify an artificial intelligence agent, a user, and/or components of the testing subsystem 166. Field 409 includes a "RequestCategory" feature with associated data. The request category may be the corresponding category of the plurality of categories to be tested associated with the test request. The plurality of categories to be tested may originate from a specified list, and may or may not encompass all possible combinations of parameters and their associated categories, or may originate from elsewhere. Field 412 includes a "Payload" feature that includes data. For example, this data may be feature data for testing the artificial intelligence agent corresponding to the test request. In some implementations, the request category may include attributes of the corresponding feature data. For example, the "RequestCategory" in FIG. 4 includes "<Delta Flights to Yaounde>" while the corresponding feature data includes datapoints "DL", "Yaounde", and "Cameroon". In some implementations, the request category may include attributes of the feature identifiers corresponding to the parameter combination. In some examples, the request category may include a category that the system, for example by parameter generation subsystem 164, has determined is insufficiently represented in the data. For example, flights to Yaounde, Cameroon, may be underrepresented in the training data used to train the artificial intelligence agent, so parameter generation subsystem 164 may create a combination of parameters for testing requests involving flights to Yaounde, Cameroon. In some implementations, the category may be a result of a random combination of parameters, as part of an exhaustive search, or another combination of parameters.

In some implementations, malfunction detection system 160 may transmit the plurality of test requests to the artificial intelligence agent to obtain a plurality of test responses. The system may provide these generated test requests to the artificial intelligence agent in the manner in which the agent would receive requests upon deployment to test how the AI agent would respond. For example, this may involve transforming a test request from one format to another, such as from a structured data object (e.g., JSON, XML, Protocol Buffers, or custom schema) to a natural language text prompt, or vice versa, in order to accommodate the input requirements of various AI models or agent interfaces. This process may be carried out in some implementations by testing subsystem 164. In some implementations, each test response of the plurality of test responses may be associated with the corresponding category of each test request. The test responses may take a variety of forms, including machine-generated text responses when the agent includes a language model (e.g., large language model) that returns text, execution results or action outputs when the agent conducts a specific operation, such as booking travel, or numerical or categorical decisions such as classifications or approvals or denials, which may be received from agents and models that are not generative. Additional metadata may accompany the test requests when transmitted to the artificial intelligence agent. In some implementations, the results may include choices of actions to be executed by the AI agent (e.g., book a particular flight of the flights shown to a user).

In some implementations, malfunction detection system 160 may transmit the plurality of test requests to one or more deployed artificial intelligence agents known to provide validated responses to the requests associated with a corresponding set of categories to obtain a plurality of control responses to the plurality of test requests. For example, the system may select an artificial intelligence agent that is already in use for responding to requests of a certain category, and this deployed artificial intelligence agent may be known to provide answers that have been tested and validated, for example validated answers within the category. As such, the system may select deployed artificial intelligence agents based on the categories associated with the test requests. The system may provide these generated test requests to the deployed artificial intelligence agent in the manner in which the agent would receive requests upon deployment to test how the agent would respond. For example, this may involve transforming a test request from one format to another to accommodate the input requirements of various AI models or agent interfaces. This may be carried out in some implementations by testing subsystem 164. The system may send one or more of the generated test requests to this agent to receive an output associated with the category. This control response may be one of a plurality of control responses for each test request, where the control responses are known to be accurate. The transmission of the plurality of test requests to one or more artificial intelligence agents may occur via communication subsystem 162, for example.

In some implementations, malfunction detection system 160 may determine, using a machine learning model for each pair of a control response and a test response, a corresponding context differential that indicates a deviation value between each test response and a corresponding control response. The context differential may include an indicator that quantifies the deviation between the validated agent's performance and the undeployed agent's performance. For example, this indicator may be a deviation value. This may be carried out by one or more machine learning models included in testing subsystem 166. In some implementations, the machine learning model may be a model trained to measure similarities between outputs of AI agents, including natural language outputs, execution operations, or categorical outputs. In some implementations, the system may use a separate machine learning model for each possible type of output. In yet some other implementations, the system may instead use an algorithm such as Hamming Distance, Cosine Similarity, or other measures of distance to measure the similarity of the responses. For example, the deviation value may be a value between 0 and 1, where 1 represents a 100% deviation for responses determined to contain completely different information, and 0 represents a 0% deviation, or responses determined to contain the same information.

FIG. 5 illustrates a data structure including example context differentials, in accordance with one or more implementations. Field 503 may include a "Request Category" feature with associated data including categories associated with test requests. Field 506 may include a "Control Response" feature with associated data including vector embeddings as an example. The format of the control response may include vector embeddings, which may numerically represent semantic or syntactic information, token IDs, which may be returned in a sequence to represent/correspond to words, sub-words, or characters in a model's vocabulary, probability distributions, graph structures, images or audio, structured data such as JSON or XML, or other suitable modes of output of an AI agent. Field 509 may include a "Test Response" feature with associated data which likewise includes vector embeddings as the example response format, however, test responses may similarly take on any suitable format. Testing subsystem 166 may include a capability to translate or transform control response formats and test response formats so that the control responses and test responses may be compared. Field 512 may include a "Deviation Value" feature with associated data including deviation values on a scale from 0 to 1 as an example. In some implementations, deviation values may be expressed on different numerical scales, represented as categorical labels (such as "acceptable" versus "unacceptable"), binary outcomes (pass/fail), qualitative assessments (e.g., "high risk", "outlier detected"), or even descriptive text explaining the nature of the deviation. Deviations may also be flagged by tags or indicators, rather than numbers, depending on the monitoring requirements and response strategy employed by the system.

In some implementations, malfunction detection system 160 may determine, based on each context differential, one or more categories where a performance of the artificial intelligence agent is deficient. In some implementations, the performance may be considered to be deficient when the deviation value meets a deviation threshold. The deviation threshold may be set automatically by the system, manually by an operator, or dynamically adjusted based on business requirements, system configuration, or risk tolerance. Referring now to FIG. 5, the system may be configured to determine that the performance is deficient for categories where the deviation values are consistently higher than 0.5. Thus, in this example, the category "Flights to Yaounde" may be a category where the undeployed artificial intelligence agent is deficient because the datapoints associated with the "Deviation Value" feature of field 512 are 0.87, 0.9, and 0.89. The system may determine a plurality of categories where the artificial intelligence agent is deficient, based on the combinations of parameters used to train the model. A deficient category may result from insufficient training data in the respective category or a poorly trained model. By identifying the deficient categories of the undeployed AI agent, the gaps may be addressed before deployment.

In some implementations, a performance of an artificial intelligence agent may be deemed "deficient" when the agent exhibits any failure, error, anomaly, or divergence from expected, specified, or policy-compliant behavior. Deficiency may include, without limitation: inaccurate, incomplete, inconsistent, or contradictory outputs; wrong operations, failed executions, or tool invocations that do not complete or produce the intended result; hallucinations, fabrications, or unsupported assertions; reasoning errors, invalid chains of thought, or illogical conclusions; unstable behavior such as high variance across similar inputs, sensitivity to immaterial prompt changes, or non-deterministic outputs beyond an allowed tolerance; low confidence where high confidence is expected, or unjustified high confidence in error-prone contexts; violations of formatting or schema requirements (e.g., JSON malformation), API contracts, or interface protocols; latency or throughput outside service-level objectives; degraded performance on protected, safety-critical, or policy-governed categories; safety, security, or compliance violations (e.g., disclosure of restricted information, prompt-injection susceptibility, policy evasion, toxic or biased content generation, or failure to enforce guardrails); refusal to act when action is required, or over-eagerness to act when abstention is required; misclassification, misranking, or suboptimal decisions against ground truth, gold standards, or validated control responses; failure to delegate to indicated deployed agents or tools when delegation is required, or inappropriate delegation when local handling is expected; mode collapse or overgeneralization (e.g., repetitive, generic, or template-like outputs that ignore salient features); data drift, concept drift, or distribution shift sensitivity leading to material performance regressions; resource misuse (e.g., excessive token consumption, API calls, or costs) relative to task norms; and any anomalous behavior detectable by statistical tests, monitoring heuristics, or domain-specific rules, including out-of-bound values, threshold breaches, or pattern deviations. A category, topic, or feature combination may be flagged as deficient when any of the foregoing conditions meet or exceed a deviation threshold, risk threshold, or reliability criterion established by the system.

In some implementations, malfunction detection system 160 may determine, based on each context differential, a categorical deviation value associated with each category of the plurality of categories. For example, the system may use the difference between the highest deviation value of a certain category and the lowest deviation value of a certain category as the categorical deviation value. Referring now to FIG. 5, Field 515 includes a "Categorical Deviation Value" feature with associated data. In continuing the above example, the categorical deviation value of the category "<Flights to Yaounde>" may be 0.03, which is the magnitude between the highest and the lowest deviation value for the category. The categorical deviation value may be determined in a number of suitable ways. For example, the categorical deviation value may be determined by calculating the average of all deviation values within the category, by computing the standard deviation to assess variability, by using median deviation values for robustness against outliers, or by applying other statistical or aggregation methods such as maximum, minimum, or quantile thresholds, depending on the desired sensitivity and use case.

In some implementations, the system may determine, based on corresponding categorical deviation values, a set of categories having one or more unpredictable categories, wherein the set of categories having the one or more unpredictable categories includes one or more corresponding categorical deviations meeting a categorical deviation threshold. For example, the categorical deviation threshold may be set automatically by the system, manually by users, or dynamically adjusted based on business requirements, system configuration, or risk tolerance. In some implementations, a category may have consistently high deviation values, meaning that the answers are consistently error-prone, and yet the category may be consistent or predictable, and categories that have both high and low deviation values may be more unpredictable. Referring now to FIG. 5, the category "<Flights to Yaounde>" was found to be a deficient category of the artificial intelligence model because of its high deviation values, but it has a low categorical deviation value, meaning that "<Flights to Yaounde>" is not an unpredictable category. However, the category "<Delta Flights to Yaounde>" has a high categorical deviation value, and if the categorical deviation threshold were set at 0.5, and unpredictable categories were categories with a categorical deviation value meeting or exceeding the threshold, "<Delta Flights to Yaounde>" would be considered an unpredictable category.

In some implementations, malfunction detection system 160 may generate a first plurality of parameter combinations with a first number of parameters. The system may then, based on determining that a first deviation value corresponding to a first request associated with the first plurality of parameter combinations does not meet the deviation threshold, generate a second plurality of parameter combinations. Each parameter combination of the second plurality of parameter combinations may include one or more additional parameters. As such, the system may limit the number of parameter combinations to be tested. In some implementations, the number of parameter combinations may be efficiently limited by using approaches such as pairwise (all-pairs) testing, where only combinations covering all possible pairs of parameter values are tested, or orthogonal array testing, which selects representative combinations. Alternatively, random sampling methods and rule-based filtering may prioritize meaningful or high-risk combinations. The system may also adaptively generate additional tests only in areas where high deviation or deficiencies are detected. Reducing the number of parameter combinations may conserve compute resources. In some examples, the second plurality of parameter combinations may be generated even when the first plurality of parameter combinations meets the deviation threshold. In some implementations, a design of experiments (DOE) analysis may be conducted to reduce the number of parameter combinations. For example, the system may apply fractional factorial designs, Latin hypercube sampling, or orthogonal arrays to select informative subsets of parameter combinations that maximize coverage of main effects and low-order interactions while minimizing the total number of tests.

In some implementations, based on determining the one or more categories where the artificial intelligence agent is deficient, malfunction detection system 160 may retrieve feature data corresponding to the one or more categories, for example using parameter generation subsystem 164. In some implementations, the feature data may be a subset of the data used to train the undeployed artificial intelligence agent, for example a subset of the data shown in the data structure of FIG. 2. The system may retrieve only data corresponding with the features associated with the category, or may retrieve more of the feature data. The system may then use the feature data corresponding to the one or more categories to generate synthetic data for training the artificial intelligence agent in relation to the one or more categories. The synthetic data may be generated by randomized sampling within the feature space, automated scenario-based generation, or leveraging generative models such as large language models to simulate realistic or edge-case user inputs. The synthetic data may include feature identifiers matching the feature data. For example, the synthetic data may create more data or fill in missing data in categories where the performance of the artificial intelligence agent is deficient, so that the agent may be retrained using the data. In some implementations, the system may, using the synthetic data, retrain one or more of the artificial intelligence agent or a deployed artificial intelligence agent tasked with monitoring the artificial intelligence agent. The system may then reexecute the above operations to check that the deficient categories have been addressed. In particular, the system may transmit a set of test requests corresponding to the one or more categories where the artificial intelligence agent is deficient to the one or more deployed artificial intelligence agents and to the artificial intelligence agent to obtain a second plurality of control responses and a second plurality of test responses that are associated with the one or more categories. The system may then generate, based on the second plurality of test responses and the second plurality of control responses, a second plurality of context differentials corresponding to the one or more categories and determine, based on the context differentials, that the artificial intelligence agent or the deployed artificial intelligence agent is no longer deficient with respect to a category of the one or more categories.

In some implementations, malfunction detection system 160 may retrieve a list of the one or more categories where the artificial intelligence agent is deficient and generate a behavioral profile for the artificial intelligence agent including metadata associated with the one or more categories. For example, the metadata associated with the categories of the behavioral profile may include feature identifiers for training features that make up the category. In another example, the metadata may include an indication of a deployed artificial intelligence agent known to provide validated responses in the deficient category. The behavioral profile may also include other attributes, such as sensitivity to feature types, as well as quantitative appropriateness of its responses in one or more categories and/or context differentials associated with categories.

In some implementations, the malfunction detection system 160 may retrieve, from the behavioral profile, the one or more categories where the artificial intelligence agent is deficient. The behavioral profile may indicate one or more deployed artificial intelligence agents for executing requests for the one or more categories. The system may then generate one or more test requests associated with each category of the one or more categories, for example, using testing subsystem 166. For example, the system may generate test requests based on the deficient categories in the artificial intelligence agent's profile so that the system may examine or monitor the agent's behavior in each of those categories. In particular, the system may transmit, to the artificial intelligence agent, the plurality of test requests and determine whether the artificial intelligence agent uses the one or more deployed artificial intelligence agents to execute the one or more test requests. For example, the artificial intelligence agent may use the one or more deployed artificial intelligence agents indicated in the behavioral profile to assist in generating a response in a deficient category of the artificial intelligence agent. In some implementations, the artificial intelligence agent may not invoke one or more of the deployed artificial intelligence agents for a deficient category and the system may initiate a closed-loop training and testing cycle in which the system: (i) logs the omission and the resulting test response; (ii) generates targeted synthetic or curated training examples emphasizing the deficient category and the expected delegation behavior (e.g., prompts paired with ground-truth responses that include explicit tool- or agent-calling traces); (iii) retrains or fine-tunes the artificial intelligence agent and/or its routing policy or guardrail configuration using the generated data; and (iv) re-tests the updated artificial intelligence agent on the same set of test requests and control requests to compute second context differentials. If the second context differentials do not meet improvement criteria (e.g., deviation values fail to drop below a delegation and accuracy threshold), the loop may automatically iterate by adjusting training emphasis, modifying delegation thresholds, or updating routing rules until the artificial intelligence agent either consistently delegates to the indicated deployed agents for the deficient category or produces validated responses without delegation. This feedback loop may be executed per category and may be scheduled continuously or on a defined cadence to maintain performance over time.

In some implementations, when the artificial intelligence agent does not invoke one or more deployed artificial intelligence agents for a deficient category, the system may employ modality-specific remediation strategies keyed to the agent's model type. In some examples, the artificial intelligence agent being tested may include a dynamic large language model that can be fine-tuned or updated in near real time; in this case, the system may capture the deployed artificial intelligence agent's validated responses and delegation traces for requests in deficient categories and use them as supervised targets to incrementally train the dynamic model and its routing policy (e.g., reinforcing the conditions under which delegation is expected), followed by automatic re-testing against the same test and control sets to confirm reduced deviation values and correct delegation behavior. In some examples, the artificial intelligence agent being tested may include a static large language model that is not retrained in deployment; in this case, the system may add the retrieved information (e.g., validated answers, step-by-step rationales, tool-calling schemas, and structured references) to a knowledge base used for retrieval-augmented generation, and configure the agent's behavioral profile or routing rules to consult this knowledge base whenever a request is classified into a deficient category.

Computing Environment

Figure 6:
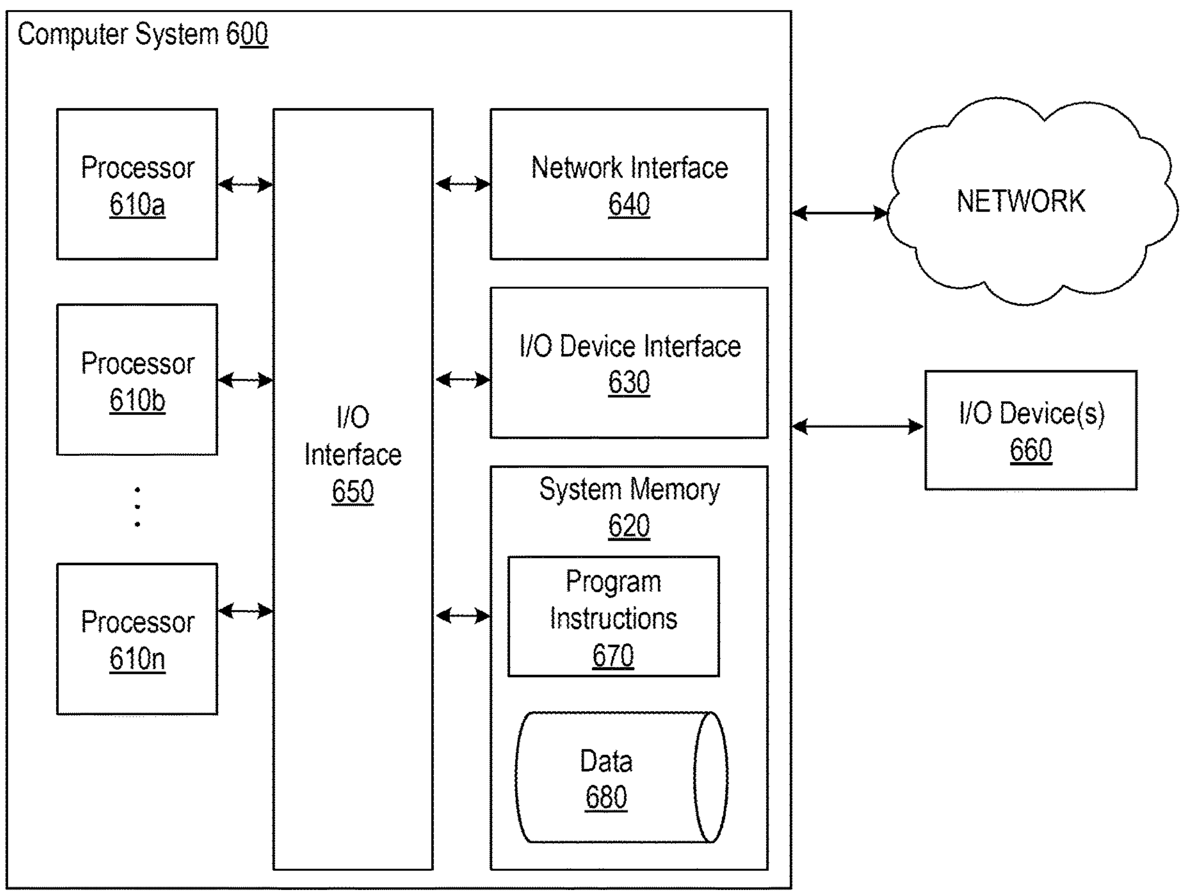
FIG. 6 shows an example computing system that may be used in accordance with some implementations of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions. [0089]/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components or distributed in additional components. Similarly, in some embodiments, the functionality of some of the illustrated components may not be provided, or other additional functionality may be available.

Figure 7:
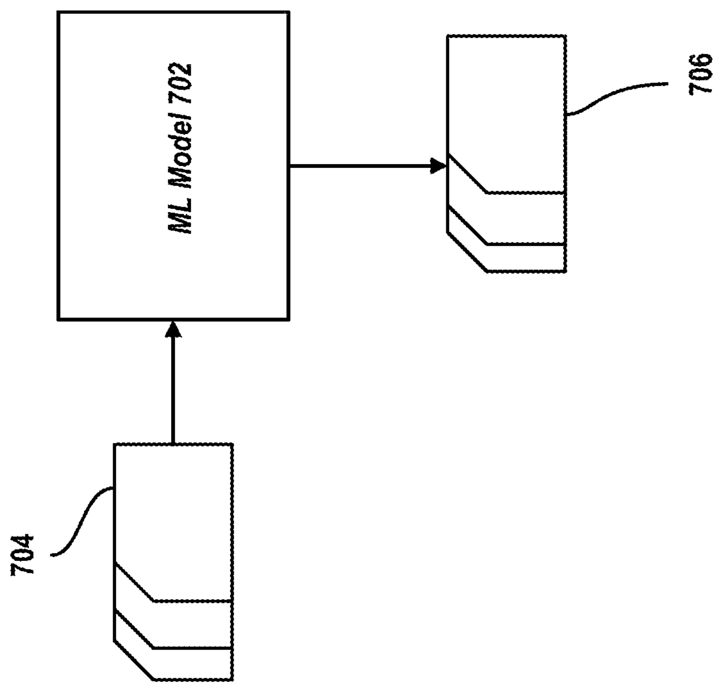
FIG. 7 is a block diagram illustrating an example machine learning model of a computing environment in which the disclosed system operates in some implementations of the present technology.

FIG. 7 illustrates an exemplary machine learning model 702. According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
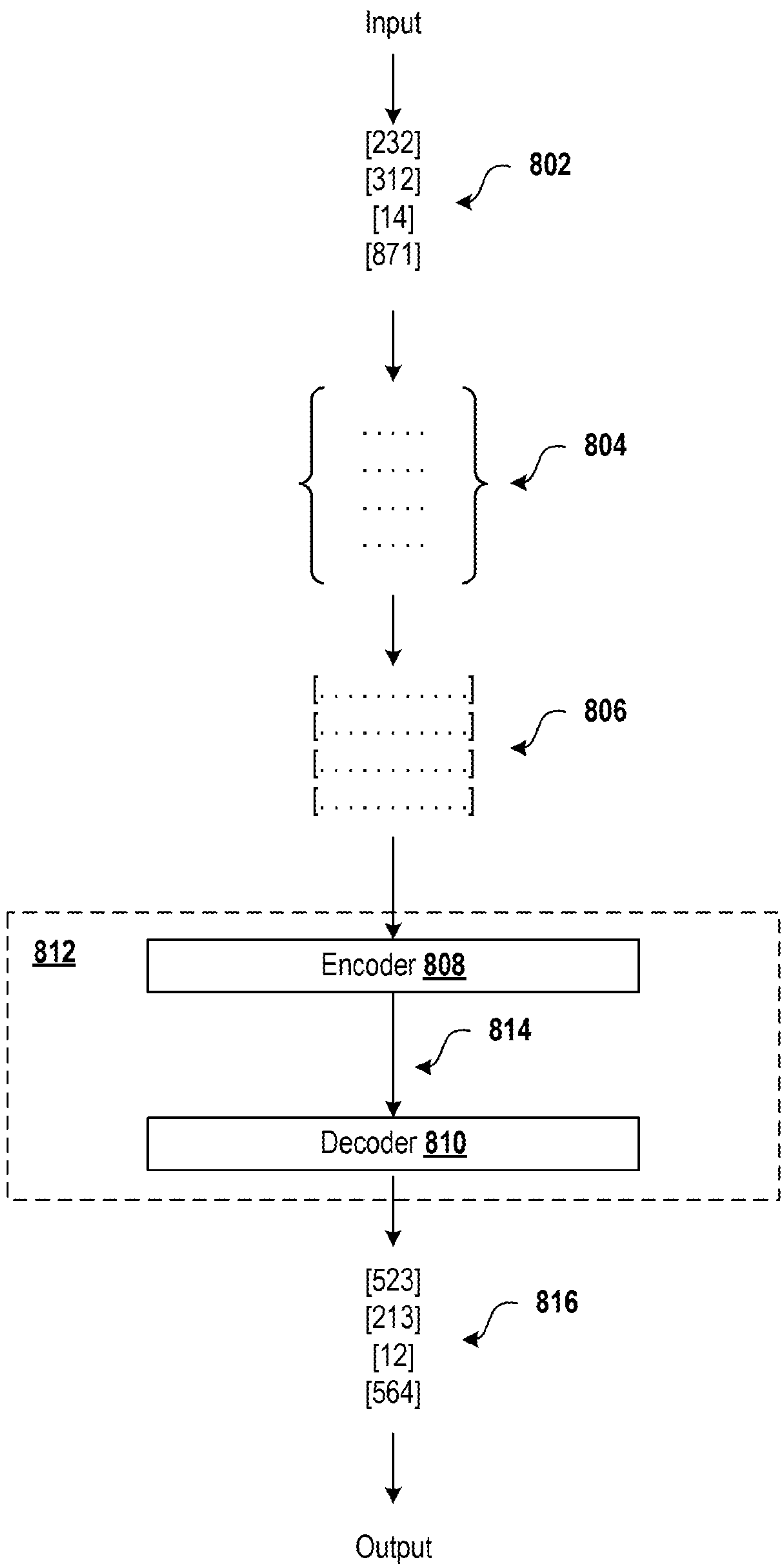
FIG. 8 is a block diagram of an example transformer that can implement aspects of the present technology.

FIG. 8 is a block diagram of an example transformer 812. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 9:
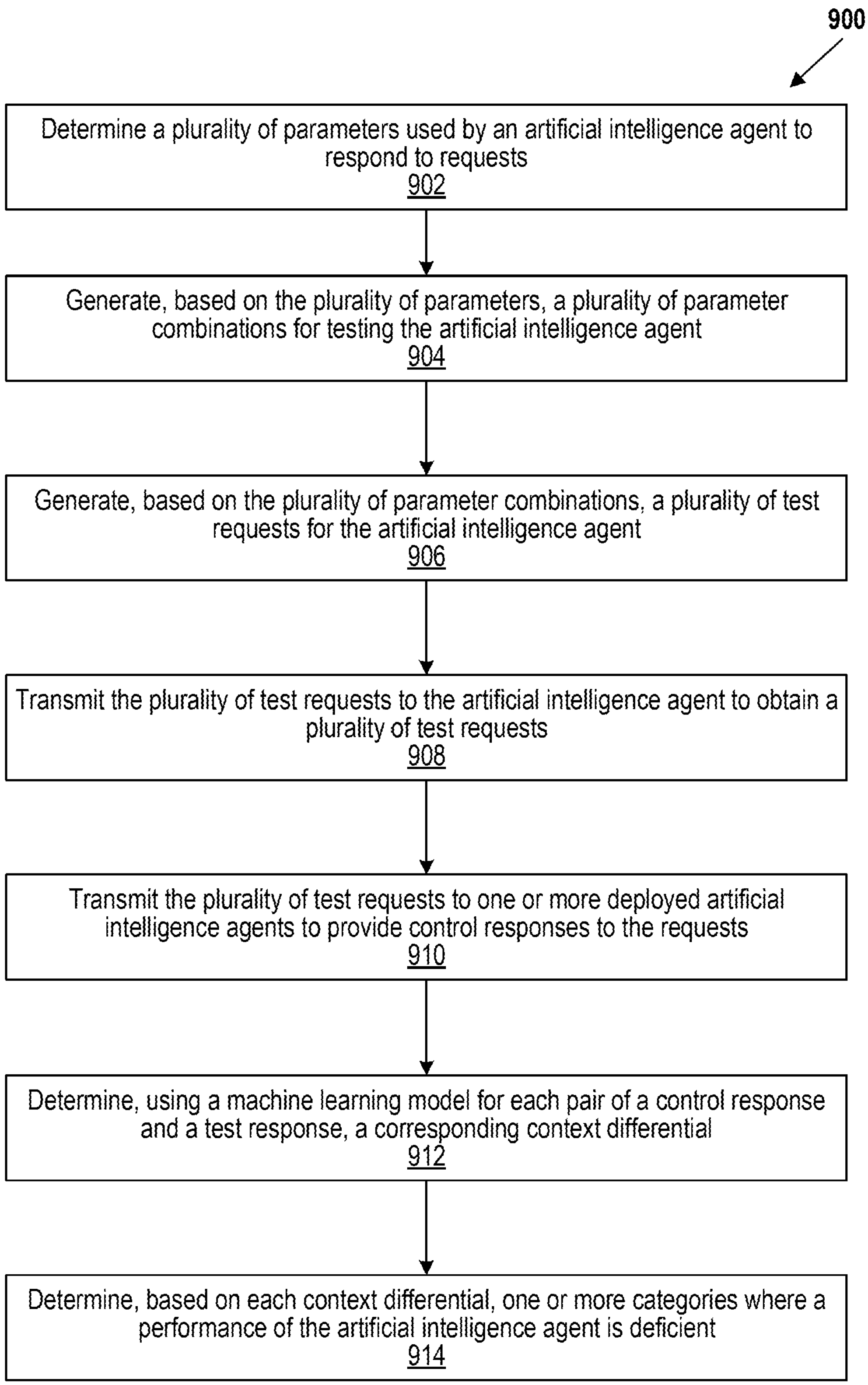
FIG. 9 shows a flowchart of the operations for detecting malfunctions within undeployed artificial intelligence agents, in accordance with one or more implementations.

FIG. 9 shows a flowchart of the operations for detecting malfunctions within undeployed artificial intelligence agents, in accordance with one or more implementations. For example, the system may use process 900 (e.g., as implemented on one or more system components described above (e.g., in FIGS. 1 and 6)) in order to detect malfunctions within undeployed or deployed artificial intelligence agents. The operations described above may be performed on a user device, in a cloud system, or using a combination of both.

At 902, malfunction detection system 160 determines a plurality of parameters used by an artificial intelligence agent to respond to requests. For example, malfunction detection system 160 may use one or more of processors 610 to retrieve a training dataset from system memory 620. In some implementations, the system may retrieve the parameters via network interface 640 if determining parameters requires access to external or distributed datasets.

At 904, malfunction detection system 160 generates, based on the plurality of parameters, a plurality of parameter combinations for testing the artificial intelligence agent. For example, malfunction detection system 160 may use a machine learning model, such as machine learning model 702, to generate a plurality of parameter combinations. The input 704 may be the training data set, while the output 706 may be the plurality of parameter combinations. Additionally or alternatively, the system may use one or more of processors 610 to generate the plurality of parameter combinations.

At 906, the malfunction detection system 160 generates, based on the plurality of parameter combinations, a plurality of test requests for the artificial intelligence agent. In some implementations, the system may use a machine learning model such as machine learning model 702 to generate a plurality of parameter combinations. The input 704 may be the plurality of parameter combinations, while the output 706 may be the plurality of test requests. In some implementations, the system may use a transformer such as transformer 812 to carry out the operation of 906. Additionally or alternatively, the system may use one or more of processors 610 to generate the plurality of test requests. The test requests may be temporarily stored in system memory 620.

At 908, malfunction detection system 160 transmits the plurality of test requests to the artificial intelligence agent to obtain a plurality of test requests. In some implementations, the system may use components such as network interface 640 and processors 610 to carry out the operation. The test requests may be retrieved from system memory 620.

At 910, malfunction detection system 160 transmits the plurality of test requests to one or more deployed artificial intelligence agents to provide control responses to the requests. In some implementations, the system may use components such as network interface 640 and processors 610 to carry out the operation. The test requests may be retrieved from system memory 620.

At 912, malfunction detection system 160 determines, using a machine learning model for each pair of a control response and a test response, a corresponding context differential. In some implementations, the system may use a machine learning model such as machine learning model 702 to determine a context differential. The input 704 may be the test responses and control responses, while the output 706 may be one or more context differentials. In some implementations, the system may use a transformer such as transformer 812 to carry out the operation of 912. The context differentials may be temporarily stored in system memory 620.

At 914, malfunction detection system 160 determines, based on each context differential, one or more categories where a performance of the artificial intelligence agent is deficient. The system may use one or more of processors 610 to carry out the operation and may access the context differentials from system memory 620.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 9.

In some implementations, the malfunction detection system may also identify requests that may need to be modified or may need to be partially or fully executed by other agents. In particular, the malfunction detection system may receive a request for an artificial intelligence agent. The request may originate from a user of the system, another artificial intelligence agent, or another suitable requester. In some examples, the request may be in the form of a natural language request, for example "Please find the best time in my calendar to book a flight under $1000 to Paris, France." In some examples, the request may be in another form that is readable by the artificial intelligence agent, such as a structured data object (e.g., a JSON or XML file), an API call, a command-line instruction, or a machine-readable protocol message.

In some implementations, the system may determine a context of the request by identifying categories that are included in the request. In particular, the system may determine, based on the request, a request context that includes a plurality of categorical parameters associated with the request. For example, the system may use a machine learning model, an artificial intelligence model, or another suitable method to parse the request to extract contextual details from the request, such as identifying that the user wishes to travel to Paris, that the user wishes to travel for under $1000, and/or that the user wishes for the agent to access their calendar to identify a time window for traveling to Paris, in continuing the example above. In some implementations, the plurality of categorical parameters may indicate one or more categories associated with the request, for example "Calendar information", "Flights to Paris", or "Flights under $1000". In some implementations, each category of the one or more categories may be associated with a corresponding reasoning domain area of a plurality of reasoning domain areas. Reasoning in an artificial intelligence agent is the process of applying logical inference, domain-specific rules, or learned patterns to analyze input data, draw conclusions, and generate contextually appropriate responses or actions within a defined subject area. For example, the artificial intelligence agent may be trained to reason in a specific set of areas, such as reasoning to identify available times in a calendar or the best flight tickets under $1000. In some examples, each reasoning domain area may correspond to a category included in a behavioral profile of an artificial intelligence agent. The reasoning domain area may be used to identify that the agent is be equipped to reason in subject matter corresponding to each category. In some implementations, each aspect or reasoning domain area of the request may involve using a different reasoning engine or model equipped for different types of tasks.

In some implementations, the system may use the behavioral profile for the artificial intelligence agent to determine which, if any, of the categories of the request are outside of the agent's reasoning capabilities. In particular, the system may compare, using a first machine learning model, a behavioral profile associated with the artificial intelligence agent with the plurality of categorical parameters associated with the request to obtain one or more deficient categories associated with the request. For example, a behavioral profile may be a data structure such as a configuration, table, or file that includes deficient categories of an artificial intelligence agent, proficient categories of an artificial intelligence agent, or other information about the reasoning capabilities of an AI agent. The system may use the record of deficient and proficient categories to dynamically adapt to changes in the agent's training or experience, for example, by updating the behavioral profile in accordance with training updates, learned new categories, or other changes in the model's capabilities. In some implementations, the one or more deficient categories of the request may correspond to one or more reasoning domain areas where an output of the artificial intelligence agent is known to have an agent output metric (e.g., an accuracy metric) not satisfying (e.g., below) a threshold.

An agent output metric may include accuracy-oriented, reliability-oriented, or quality-oriented measures. Examples include, without limitation: task accuracy rates (e.g., exact match, top-1/top-k correctness, F1, precision/recall), semantic similarity or proximity to an ideal response, such as cosine similarity between response embeddings and one or more gold-standard or category prototype embeddings, centroid distance within a category-specific vector space, or minimum distance to a validated response manifold, hallucination metrics, including source hallucination rate (rate of fabricated or ungrounded citations), factual error rate against knowledge bases, contradiction rate against provided context, or unsupported-claim frequency, calibration metrics, including Brier score, expected calibration error, overconfidence/underconfidence indices, or abstention/deferral appropriateness, consistency and stability metrics, including variance across paraphrased or perturbed prompts, reproducibility across seeds, or sensitivity to immaterial context changes, structural and compliance metrics, such as adherence to schemas (e.g., JSON validity), API contracts, tool-calling protocols, and policy/guardrail conformance, decision-quality metrics (utility, cost, regret, or reward) including safe-action rates and violation counts, delegation metrics, including correct routing/hand-off rate to domain agents for deficient categories, missed-delegation rate, and inappropriate-delegation rate, efficiency metrics, including latency, throughput, token/call cost, or tool usage efficiency versus task norms, robustness/drift metrics, such as performance under distribution shift, adversarial prompts, or noisy inputs, or degradation rates over time, user-centered metrics, including user satisfaction scores, edit distance to accepted responses, human-in-the-loop correction rate, or escalation rate, or composite or category-specific indices that weight any of the foregoing by risk, criticality, or policy priority. Any one or more of these metrics may be aggregated per category or reasoning domain and compared to thresholds to determine whether a category is deficient.

For example, if the artificial intelligence agent has been trained to book trips, but it is asked to schedule a meeting between multiple people with different calendars, a category such as "identify calendar overlaps" may be outside of the domain areas of the artificial intelligence agent and as such the artificial intelligence agent may generate low-accuracy responses to such requests. As such, the example category would be labeled as a "deficient" category of a request. In some implementations, requests may correspond to both deficient categories and categories that are not deficient ("proficient" categories). In such implementations, the system may selectively route portions of the request associated with proficient categories to the artificial intelligence agent for processing, while delegating portions associated with deficient categories to one or more domain-specific agents or alternative processing modules so that each part of the request may be handled by a capable resource.

In some implementations, the system may determine a new artificial intelligence agent that is proficient in reasoning domain areas where the current artificial intelligence agent is deficient. In particular, the system may, based on the one or more deficient categories of the request or based on obtaining the one or more deficient categories of the request, determine a first domain-specific agent of a plurality of domain-specific artificial intelligence agents. For example, the domain-specific agent may have a behavioral profile listing its proficient categories associated with its proficient reasoning domain areas, which may include deficient categories of the artificial intelligence agent. In some implementations, the first domain-specific agent may be known to provide valid responses in a set of deficient categories. For example, the first domain-specific agent may have undergone a testing process which validated the domain-specific agent's responses in the deficient categories before adding the deficient categories to a behavioral profile associated with the first domain-specific agent. In some examples, the system may have access to a plurality of domain-specific agents with reasoning capabilities corresponding to different reasoning domain areas. The system may select the domain-specific agent with reasoning capabilities (e.g., capabilities listed in a behavioral profile) aligning with the deficient categories included in the request. For determining a domain-specific agent from a plurality of domain-specific agents, the system may have access to a centralized registry, database, or directory that can store up-to-date behavioral profiles, performance metrics, and/or validated reasoning capabilities for each available agent. This resource can enable the system to efficiently query and compare agents based on their documented strengths and select the most suitable agent for each deficient category identified in the request.

In some implementations, the system may take the part of the request that is associated with the deficient categories of the artificial intelligence agent, adjust it so that it is readable by an artificial intelligence agent, and send that portion to the first domain-specific agent to process. In particular, the system may modify, based on a reasoning domain area associated with a deficient category of the one or more deficient categories, a first portion of the request to be executed by the first domain-specific agent. For example, if a request says, "Please find an overlapping time in my family's calendar to book a trip to Paris, France under $1000", the system may take the part of the request that says "Please find an overlapping time in my family's calendar" and transmit that part to the first domain-specific agent. The system may adjust the format of the part to be readable by another agent, for example, by transforming the natural language instruction into a structured data object, such as a JSON or XML payload, or by reformatting the request into a standardized API call or protocol message or another format that conforms to the input requirements of the domain-specific agent. In some implementations, the first portion of the request may include a portion of the request related to the reasoning domain area associated with the deficient category. In continuing the above example, finding an overlapping time across calendars may be outside the reasoning domain areas of the artificial intelligence agent, so the request may fall into a deficient category of the artificial intelligence agent. As such, that part of the request may be sent to the domain-specific agent for execution.

In some implementations, modifying the request to be executed by the first domain-specific agent may include creating a sub-request from the portion of the original request to be sent to one or more domain-specific agents for execution. In particular, using the one or more deficient categories associated with the request, the system may generate one or more sub-requests comprising one or more portions of the request. For example, the system may use a machine learning model configured to identify and segment request components relevant to specific deficient categories to generate sub-requests by analyzing the original request, extracting portions that correspond to the identified deficient categories, and packaging these portions into targeted sub-requests for execution by the appropriate domain-specific agents. A task such as this may require a machine learning model with natural language processing capabilities, for example, if the original request is a natural language request. In some implementations, each portion may correspond to the deficient category associated with the reasoning domain area. For example, if the original request includes both an "identify overlaps" and an "access multiple calendars" inquiry, the system may segment the request so that the "identify overlaps" portion is routed to an agent specialized in calendar reasoning, while the "access multiple calendars" portion is routed to an agent configured to access user calendars, for example, on Outlook or Google Calendar. Each sub-request being associated with a deficient category can enable more accurate and context-appropriate responses. A first sub-request may include the first portion of the request, and other sub-requests may include other portions of the request, for example, if the original request had multiple deficient categories which can be sent to one or more artificial intelligence agents for execution. In some implementations, the sub-requests may be of a different form than the original requests. For example, the artificial intelligence agent may accept natural language requests, while the domain-specific agents may be configured to execute structured queries, API calls, or function invocations that require data in a predefined format, such as SQL statements, JSON payloads, or calendar-specific command protocols. In general, the system to translate requests of a first format into machine-readable instructions of a second format tailored to the operational requirements of each domain-specific agent.

In some implementations, the sub-request(s) may be associated with corresponding metadata indicating that each sub-request corresponds to the one or more deficient categories. This metadata may be used to identify a domain-specific agent, for example by including category identifiers, tags, or domain labels within the metadata that are matched against a registry or lookup table of available domain-specific agents. The system may then automatically route each sub-request to the agent whose capabilities align with the deficient category indicated in the metadata.

FIG. 10 illustrates a possible structure for requests and sub-requests, in accordance with one or more implementations. FIG. 10 includes request 1000 and sub-request payload 1002, which has corresponding data structure 1004. In some implementations, when the system receives a request designated for an artificial intelligence agent, the system may generate one or more sub-requests that include one or more portions of the request. In FIG. 10, the request 1000 reads "Please find the best time in my calendar to book a flight under $1000 to Paris, France." Request 1000 is associated with sub-request payload 1002. In some implementations, request 1000 and sub-request payload 1002 may be stored in a data structure such as a database. Sub-request payload 1002 may represent a filename or a pointer in memory to a data repository, such as data structure 1004, which may store sub-requests and corresponding metadata. Data structure 1004 may take the form of a database, a key-value store, a table in memory, a flat file, or any other suitable structure for storing and/or recording data.

Data structure 1004 includes sub-request column 1006, category column 1008, and deficiency indicator column 1010. Sub-request column 1006 may store sub-requests derived from the original request. For example, sub-requests of request 1000 could include "retrieve calendar information", "retrieve user flight preferences", or "select flight that matches". Each sub-request may have a corresponding category, stored in category column 1008. For example, "retrieve user flight preferences" may correspond to a "user_preferences" category. In some implementations, the categories may correspond to reasoning domain areas where the artificial intelligence agent may or may not be trained to reason or otherwise operate. For example, the artificial intelligence agent may be trained to retrieve user preferences, for example from a user behavioral profile. As such, the "user_preferences" category may not be a deficient category based on the behavioral profile of the artificial intelligence agent. However, sub-request "Find airline schedules" may correspond to category "Flight_RAG". The artificial intelligence agent may not be trained to retrieve information from outside sources such as airline websites. As such, the "Flight_RAG" category may be a deficient category.

Deficient categories of the artificial intelligence agent's corresponding behavioral profile may be indicated in deficiency indicator column 1010. In some examples, the system may use the deficiency indicators in the deficiency indicator column 1010 to determine which categories to send to a domain-specific artificial intelligence agent for execution. In the example of FIG. 10, because the artificial intelligence agent may not be trained to retrieve information from airline websites as indicated by the deficiency indicator, the system may send the sub-request associated with the deficient category to a domain-specific agent for execution. In some implementations, the system may not create a sub-request for every category of the request, but instead may assess the categories of the request and generate sub-requests only for deficient categories of the request, for example to save time, energy, or memory.

In some implementations, the system may create a new request by taking the response from the domain-specific agent to the part of the request and inserting it into the original request. In particular, the system may generate a modified request including a domain-specific response from the first domain-specific agent as a replacement for the first portion of the request. In continuing the above example, if the original request was "Please find an overlapping time in my family's calendar to book a trip to Paris, France, under $1000", and the domain-specific agent processed the "Please find an overlapping time in my family's calendar" part of the request, the output could be "June $2^{nd}$-June $10^{th}$". The system may modify the original request by inserting "June $2^{nd}$-June $10^{th}$" into the request so that it reads "Please book a trip for my family for June $2^{nd}$-June 10th to Paris, France, under $1000". The modification of the response may further include natural language processing (e.g., a template-based approach, context-aware text generation, or semantic parsing) or another method of adding the response into the request to replace the first portion in a manner that renders the request readable by the artificial intelligence agent. For example, the system may update a structured data object, such as a JSON or XML file, by replacing or populating specific fields or nodes with the response from the domain-specific agent. In some cases, the system may generate or modify an API request, a protocol buffer message, or another machine-readable format by programmatically inserting the response data into the appropriate parameter, attribute, or key-value pair. In general, the modified request may conform to the expected schema or data structure required by the artificial intelligence agent for further processing.

In some implementations, the system may modify the request by including an indication of response data from the domain-specific agent in the modified request. In particular, based on the domain-specific response from the first domain-specific agent, the system may generate response data corresponding to the one or more reasoning domain areas associated with the first portion of the request. The response data may include structured data extracted from the domain-specific response from the first domain-specific agent. For example, the response data may be a data table retrieved from a data source for executing the sub-request. The system may modify the original request to incorporate the response data. The response data, or an indication of the response data, may replace one or more portions if the request corresponding to the one or more deficient categories. For example, the modified response may include a pointer in memory, a data table, or a reference to an external file, a URI (Uniform Resource Identifier), or an object identifier such that the artificial intelligence agent can now access information that it was unable to access or produce due to the needed information being associated with a deficient category.

In some implementations, each response to the one or more sub-requests may replace a corresponding portion of the request. For example, the domain-specific agent may perform context-informed reasoning as a part of the execution of the sub-request. This may include leveraging contextual information such as user preferences, historical data, or context from the original request to generate a response. The resulting response can then be integrated into the original request. In addition to or instead of incorporating a pointer to a data table so that the artificial intelligence can perform the reasoning task, the domain-specific agent may provide a prior level of reasoning, the results of which can be inserted into the original request. For example, instead of providing a data table of overlapping times in a family's calendar, the domain-specific agent may use the contextual information about the family or from the request (such as best times of year to travel to Paris or busiest times of year in a work or school calendar) to reason about the best overlapping time and contributing the reasoned response to the modified request.

FIG. 11A and FIG. 11B illustrate another possible structure for requests and sub-requests, in accordance with one or more implementations. FIG. 11A shows a modified request 1100 and a data structure 1102. In some implementations, the system may generate a modified request including parts of the original request and parts of the response to the executed request from one or more domain-specific agents. In continuing the example referred to in explaining FIG. 10, if an artificial intelligence agent receives a request such as "Please find the best time in my calendar to book a flight under $1000 to Paris, France", but is not trained to retrieve flight schedules from airline websites, the system may create a sub-request corresponding to that deficient category upon determining that the deficient category is associated with the request. The request may then be transmitted to a domain-specific agent that is equipped to retrieve flight data from airline websites.

Because the system generated a sub-request to retrieve data, in some implementations, the domain-specific agent may return a data table such as data structure 1102. Data structure 1102 may contain appropriate flight information such as flight number, airline, destination, date, and price of various flights. The original request may be modified into a request such as modified request 1100 to include an indication of the data table where flight information can be found. As such, by transmitting modified request 1100 to the artificial intelligence agent, the agent may search the table for information instead of having to access airline websites, which may be outside of the agent's reasoning domain areas and within the agent's deficient categories. More generally, in some implementations the system may transmit sub-requests for data retrieval or other operations to domain-specific agents but leave the reasoning tasks in the request by providing the original artificial intelligence agent with data or pointers to data that it needs to perform reasoning tasks and other operations.

In some implementations, the reasoning tasks may be performed by the domain-specific agents, with results added to the modified request. FIG. 11B shows a modified request 1150 that includes the original request modified to include specific flights which may be the result of reasoning by a domain-specific agent. For example, the sub-request that is sent to a domain-specific agent may be associated with metadata, including context or requirements for the sub-request. In continuing the above example, the sub-request "Find airline schedules" may be associated with metadata such as "flights to Paris, France" and "Under $1000". In some examples, the domain-specific agent may perform a reasoning step based on the metadata. For example, knowing the destination and price constraints, the domain-specific agent may retrieve flight information, as represented in data structure 1152, and assess the flight information to determine which flights fit within the constraints included in the metadata.

The response by the domain-specific artificial intelligence agent may be a result of reasoned retrieval or selection. For example, the domain-specific artificial intelligence agent may return flight options that fit within the constraints of the response. The response may be integrated into the request to generate the modified request 1150. For example, the modified request may include flight data pertaining to flights that fit within the constraints so that the first artificial intelligence agent may select from among the reasoned flights. In some implementations, the integration of responses from domain-specific agents into the modified request may occur in various data formats (e.g., structured tables, JSON, XML, or other machine-readable formats), and the system may include logic for parsing, validating, or transforming such data as needed.

In some implementations, the system may cause the modified request to be executed by the artificial intelligence agent, for example, by transmitting the modified request to the artificial intelligence agent for execution. The system may further use responses to requests by domain-specific agents to train the artificial intelligence agent about how to execute requests in deficient categories. In particular, based on the one or more deficient categories of the request or based on obtaining the one or more deficient categories of the request, the system may determine that the one or more deficient categories of the request are included in the behavioral profile of a second domain-specific agent indicating that the second domain-specific agent is known to provide accurate responses to the one or more deficient categories. For example, the second domain-specific agent may be configured to apply specialized algorithms or access domain-specific data sources for the deficient categories, for example. The system may transmit the request to the second domain-specific agent to obtain a response. The system may add the request and the response to a dataset for training the artificial intelligence agent. The artificial intelligence agent may be trained by using these responses as training data or reference outputs to improve the artificial intelligence agent's performance in handling similar requests in the future.

In some implementations, the system may assess the performance of the artificial intelligence agent upon execution of the modified request by measuring the accuracy of the response to the modified request. In particular, the system may receive a response to the modified request executed by the artificial intelligence agent. The system may determine, using a machine learning model trained to measure a degree of accuracy of agent response to requests, an accuracy parameter corresponding to the response to the modified request. For example, the system may determine a context differential indicating a deviation value between the response and a corresponding control response, for example, executed by the second domain-specific agent. The accuracy parameter may be a quantitative score, such as a similarity metric, confidence value, or error rate that reflects how closely the artificial intelligence agent's response matches the control response. The system may further determine whether the accuracy parameter corresponding to the response meets an accuracy threshold. In some implementations, the system may send a report to an operator or add an indicator in a behavioral profile of the artificial intelligence agent about the accuracy of the response to the modified request.

In some implementations, the system may evaluate the response to the modified request for presence of bias. If the bias is detected, the system may determine whether the bias matches a user profile. In particular, the system may receive a response to the modified request executed by the artificial intelligence agent and determine, using a machine learning model configured to detect context similarity, whether a response context of the response matches one or more bias context retrieved from a bias database. In some implementations, the context similarity machine learning model may be trained to measure a degree of context similarity between a particular bias context from the bias database and a particular response. For example, the model may compare linguistic patterns, sentiment, or decision rationales or outcomes present in the response with those stored in the bias database, and assign a similarity score indicating how closely the response aligns with known bias contexts. Based on determining that the response context matches a bias context from the bias database, the system may generate an indication of a bias detected within the response. For example, the indication may be sent to a system operator or the indication may be used by the system to assess whether the bias matches a user behavioral profile. In some implementations, determining that the bias of the agent matches the user-preferred bias may determine which treatment will be used for the response. For example, if the bias matches the user preference, the response may be considered acceptable and delivered as-is to the user. If the bias does not match the user preference, the response may be corrected or regenerated with an instruction to ignore the bias, or the user may receive a notification that bias has been detected in the response.

In some implementations, the system may receive a user behavioral profile associated with a user that generated the request. The user behavioral profile may be a data structure containing information about the user's historical or documented preferences, interaction patterns, decision-making tendencies, or previously exhibited biases. For example, a user may have a preference for a certain airline, which may be recorded in a database of past interactions, or be a member of a loyalty program at a certain airline. The system may determine whether the bias detected within the response matches a user-preferred bias within the user behavioral profile. For example, the responses from the agent may be biased toward an airline for which the user behavioral profile has a matching preferred bias. In some implementations, based on determining that the bias detected within the response matches the user-preferred bias within the user behavioral profile, the system may refrain from modifying the request. In some implementations, based on determining that the bias detected within the response does not match the user-preferred bias within the user behavioral profile, the system may modify the request with a set of instructions to the artificial intelligence agent to avoid the bias. For example, the system may generate instructions directing the artificial intelligence agent to re-rank or filter response options to exclude those that reflect the detected bias or to explicitly prioritize options that are neutral or align with the user's documented preferences. The instructions may also specify constraints or guidelines for generating future responses to minimize the recurrence of similar bias. The set of instructions may include the indication of the bias.

Figure 12:
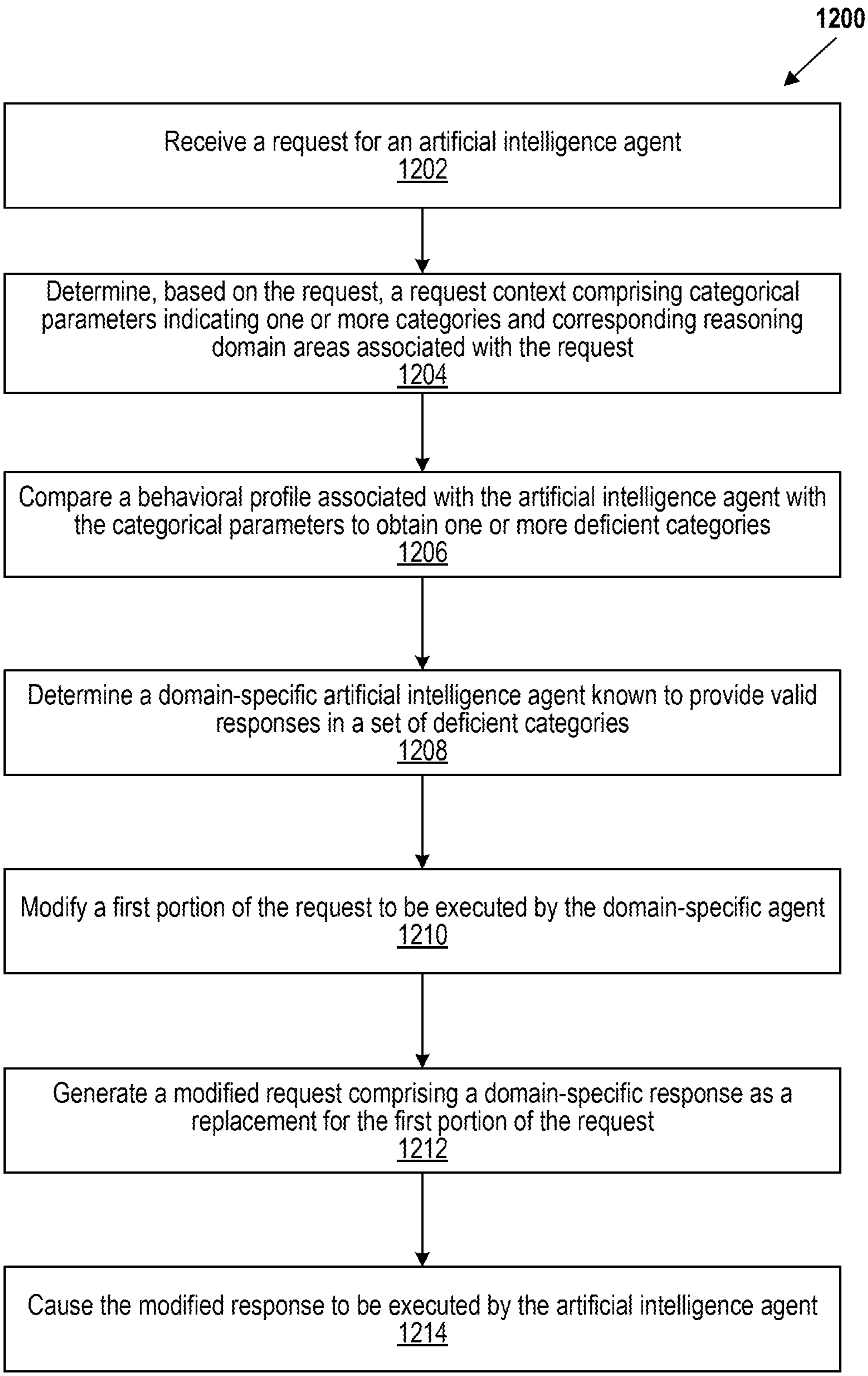
FIG. 12 shows a flowchart of the operations for testing and monitoring artificial intelligence agents, in accordance with one or more implementations.

FIG. 12 shows a flowchart of the operations for testing and monitoring artificial intelligence agents, in accordance with one or more implementations. For example, the system may use process 1200 (e.g., as implemented in one or more system components described above (e.g., in FIGS. 1 and 6)) in order to test and monitor artificial intelligence agents. The operations described may be performed on a user device, in a cloud system, or using a combination of both.

At 1202, the malfunction detection system 160 receives a request for an artificial intelligence agent. For example, the malfunction detection system 160 may use one or more of processors 610 to receive a request from a user or another artificial intelligence agent over network interface 640.

At 1204, the malfunction detection system 160 determines, based on the request, a request context comprising categorical parameters indicating one or more categories and corresponding reasoning domain areas associated with the request. For example, malfunction detection system 160 may use a machine learning model, such as machine learning model 702, to process the request to determine a request context. The input 704 may be the request, while the output may be a plurality of categorical parameters indicating one or more categories associated with the request. The system may interface with the machine learning model via, for example, I/O interface 650 and/or network interface 640.

At 1206, the malfunction detection system 160 compares, using a first machine learning model, a behavioral profile associated with the artificial intelligence agent with the categorical parameters to obtain one or more deficient categories. For example, malfunction detection system 160 may use a machine learning model, such as machine learning model 702, to execute the comparison, where the input 704 may be the behavioral profile and the categorical parameters and the output may be a list of deficient categories, or, additionally or alternatively, the system may use one or more of processors 610 to execute the comparison.

A 1208, the malfunction detection system 160 determines a domain-specific artificial intelligence agent known to provide valid responses in a set of deficient categories. The malfunction detection system 160 may access a plurality of domain-specific agents or a plurality of behavioral profiles associated with a plurality of domain-specific agents by accessing system memory 620 and/or network interface 640.

At 1210, the malfunction detection system 160 modifies a first portion of the request to be executed by the domain-specific agent. In some implementations, the system may use a machine learning model such as machine learning model 702 to modify the first portion of the request. The input 704 may be the entire request plus an indication of the deficient category or the portion of the request to be modified, and the output 706 may be a modified portion of the request or a sub-request.

At 1212, the malfunction detection system 160 generates a modified request comprising a domain-specific response as a replacement for the first portion of the request. In some implementations, the system may use a machine learning model such as machine learning model 702 to generate the modified request. The input 704 may be the domain-specific response and the original request, and the output 706 may be the modified request. At 1214, the malfunction detection system 160 causes the modified response to be executed by the artificial intelligence agent.

In some implementations, the system may further patch and/or retrain artificial intelligence agents. The system may assess that a response to a request for an artificial intelligence agent is deficient. In particular, the system may determine that a response from an artificial intelligence agent is deficient. The response may correspond to a request sent to the artificial intelligence agent. In some implementations, the response is deficient if the request is associated with one or more deficient categories. For example, an artificial intelligence agent may receive a request that corresponds to one or more deficient categories of the artificial intelligence agent. If the artificial intelligence agent executes a request that corresponds to deficient categories (e.g., as denoted in a behavioral profile of the artificial intelligence agent) and generates a response (e.g., without sending a portion of the request to a domain-specific agent), the system may determine that the response is deficient.

In some implementations, determining that the response from the artificial intelligence agent is deficient may include receiving a trigger event associated with the response received from the artificial intelligence agent. The trigger event could be a user flagging the response as incorrect or unsatisfactory, a detection of an inclusion in the response of an indication that the request pertains to a deficient category of the artificial intelligence agent, a randomized test, an expiration of a predetermined period of time, a certain number of responses generated, or another suitable trigger. The system may receive (e.g., responsive to the trigger event) a second response to the request executed by a domain-specific artificial intelligence agent, wherein the domain-specific artificial intelligence agent uses a second or different plurality of parameters to execute the request. For example, the domain-specific agent may use the second plurality of parameters as input for retrieval-augmented generation (RAG) to retrieve relevant data from the second plurality of parameters and incorporate the retrieved information into the generated response. The system may determine, using a machine learning model, a context deviation value between the response and the second response. The context deviation value may indicate a deviation between the response and the second response, for example a semantic similarity score, an embedding distance (such as cosine similarity or Euclidean distance) between the textual representations of the two responses, or a difference in key factual elements or entities extracted from each response, for example, using natural language processing. Based on determining that the context deviation value exceeds a predetermined deviation threshold, the system may determine that the response from the artificial intelligence agent is deficient.

Responsive to determining that the response is deficient, the system may access the parameters and dataset used to train the artificial intelligence agent. In particular, based on the response being deficient, the system may identify a first plurality of parameters used by the artificial intelligence agent to respond to the request, wherein the first plurality of parameters corresponds to a set of features within a first dataset with first feature data and wherein the first dataset was used in training the artificial intelligence agent in one or more categories corresponding to the request. The dataset may include features, which are distinct attributes, variables, or input factors that characterize aspects of the data relevant to the agent's reasoning or decision-making process. Each feature may have corresponding feature data, which may be specific values, examples, or instances associated with those attributes, such as text strings, numerical values, categorical labels, or other data types that provide concrete information for model training. In some implementations, the parameters and/or feature data may correspond to sequences of natural language requests and responses, conversation histories, or partially completed prompts, which are used to train the artificial intelligence agent to generate contextually appropriate and coherent outputs based on the patterns learned from the interactions. In another example, parameters may correspond to feature data used to train the artificial intelligence agent, including feature identifiers such as "Airline" or "City" and feature data such as "Delta Airlines" or "Rome".

FIG. 13A illustrates a possible data structure for storing a plurality of parameters, in accordance with one or more implementations. The data structure may be embodied as a table, spreadsheet, or any other suitable structure for storing data. The plurality of parameters may correspond to a set of features within a first dataset. For example, the data structure of FIG. 13A shows column 1303 associated with a "Price" feature, column 1306 associated with an "Airline" feature, column 1309 associated with a "Destination City" feature, column 1312 associated with a "Destination Country" feature, and column 1315 associated with a "Parameters" feature. In some implementations, a feature may be represented as a column in the data structure, an attribute in a database schema, or an entry in a key-value pair, depending on the format and requirements of the implementation.

Each feature in the dataset pictured in FIG. 13A may have feature data. For example, the "Price" feature in column 1303 has associated feature data representing a series of prices for airplane tickets. In some implementations, a dataset may be used to train artificial intelligence agents to respond to requests. The data in a dataset may be collected or recorded at a certain time. If the data in the dataset is not periodically updated or added to, the data may become outdated, and as a consequence, artificial intelligence agents trained on the data may give outdated responses to answers as the data becomes outdated. In some implementations, data may become outdated if the underlying distribution of the feature data associated with one or more features drifts away from the original distribution. For example, the center or spread of quantitative data or the counts of categorical data may change. For datasets including tokens, which are used to train generative AI models, the frequency and contextual usage of specific tokens may shift over time, resulting in changes to the statistical properties of the token distribution. This may cause the artificial intelligence agent to generate responses that are less relevant or accurate, as the model's understanding of language patterns, terminology, or named entities becomes misaligned with current usage.

In some implementations, the system may retrieve a different dataset from the one that was used to train the artificial intelligence agent. In particular, the system may identify a second plurality of parameters corresponding to the set of features within a second dataset, the set of features having second feature data different than the first feature data. For example, the second dataset may contain the same features as the training data, for example "Airline" or "City" in continuing the example above, but may contain different feature data. In some implementations, the feature data may include the same labels or numbers, for example "Delta Airlines" or "Rome", but in a different distribution than the first dataset. For example, the second dataset may include feature data that was collected after the first feature data, so the second feature data is "newer" than the first feature data, suggesting a more current data distribution than the first feature data. This may happen, for example, when data shifts. In continuing the above example, data could shift if a new airline, such as "USPTO Airlines" is introduced into the data, changing the distribution of the feature data associated with the "Airline" feature. In another example, the second dataset may reflect seasonal or event-driven changes, such as a sudden increase in flights to a particular city due to a major international event, resulting in a different frequency or pattern of feature data for the "City" or "Date" features. Alternatively, the second dataset may capture changes in user preferences or behaviors, such as a shift in preferred airlines or destinations over time, or may include corrections or updates to previously mislabeled or incomplete data, thereby altering the statistical properties of the feature data compared to the first dataset. Additionally or alternatively to a dataset capturing a different time, the second dataset may capture a data distribution reflecting a different or "shifted" population, where the underlying user base, demographic group, geographic region, or market segment represented in the data differs from that of the first dataset. For example, the first dataset may be composed primarily of data from business travelers in North America, while the second dataset may reflect leisure travelers from Europe, resulting in different patterns of airline, city, or date preferences. Such population shifts may introduce new trends, behaviors, or feature correlations that were not present or prevalent in the original training data, thereby impacting the performance of the artificial intelligence agent by affecting its ability to accurately reason or predict in a shifted topic area or population.

The system may pick up on these differences between the first dataset and the second dataset. In particular, the system may detect, based on comparing the first plurality of parameters with the second plurality of parameters, a data drift between the first dataset and the second dataset. The data drift may indicate that the first feature data corresponding to one or more features of the set of features within the first dataset has a different statistical distribution than the second feature data corresponding to the one or more features of the set of features within the second dataset. For example, the system may detect a qualitative difference in categorical features (e.g., the system may detect that the frequency of certain destinations or travel dates has changed between the first dataset and the second dataset) or a quantitative difference in numerical features (e.g., the system may determine that the average ticket price for flights to a particular city has increased in the second dataset compared to the first dataset).

FIG. 13B illustrates a possible data drift in a data structure, in accordance with one or more implementations. The data structure in FIG. 13B displays a data drift in columns 1359 and 1362, where the distribution of destination cities and countries have drifted from columns 1309 and 1312. In some examples, the data structure of FIG. 13A may be a data structure with "outdated" data, while the data structure of FIG. 13B may have "updated" data. For example, if the feature data of FIG. 13A was collected a certain time period before the feature data of FIG. 13B, then the feature data in FIG. 13B may be considered newer or more updated data. For example, if airlines shift business from international airport hubs to domestic airport hubs over the span of a few years, then AI agents trained on datasets including mostly international hubs, such as the data structure in FIG. 13A, may not have the data needed to accurately reason about domestic flights as the statistical distribution of flights drifts toward the data in the data structure in FIG. 13B. However, parts of the data structure may maintain the same distribution, for example, columns 1353, 1356, and 1365, which have not changed in statistical distribution from FIG. 13A. When a proportion of columns below a certain threshold (for example, 50%) "drift" or change in statistical distribution to a statistically significant degree as represented in FIG. 13B, the system may retrain the model using only the columns that have drifted and maintaining the training on columns that have not drifted.

FIG. 13C illustrates another possible data drift in a data structure, in accordance with one or more implementations. In FIG. 13C, the distributions of the feature data in the "Price" column 1383, the "Airline" column 1386, and the "Parameters" column 1395 have shifted in addition to the "Destination City" column 1389 and the "Destination Country" column 1392. In the example of FIG. 13C, a proportion of columns above the 50% threshold have shifted in distribution. As a result, the system may retrain the artificial intelligence agent using the entirety of the data structure in FIG. 13C, rather than selecting certain features to use to update the agent's training.

In some implementations, the system may use a machine learning model to detect the data drift. In particular, the system may calculate, using a machine learning model, a drift metric from the first plurality of parameters to the second plurality of parameters. The machine learning model may be configured to determine a numerical distance between a first subset of the first feature data and a second subset of the second feature data. For example, the machine learning model may compute the Wasserstein distance (also known as Earth Mover's Distance) between the distributions of ticket prices in the first and second datasets, or may use a kernel-based method to estimate the Maximum Mean Discrepancy (MMD) between the feature vectors. In another example, the model may apply principal component analysis (PCA) to both datasets and measure the change in variance explained by the principal components or may use a supervised drift detector that is trained to classify whether a given sample is more likely to originate from the first or second dataset. In some implementations, based on the drift metric exceeding a threshold, the system may retrain the artificial intelligence agent in the plurality of request categories using the second plurality of parameters. For example, the system may initiate a retraining pipeline that updates the model weights and parameters corresponding to the categories using the most recent dataset. The retraining process may include feature extraction, data preprocessing, and validation steps to enable generalization to the latest data distribution.

In some implementations, the system may use a statistical method (e.g., the Kolmogorov-Smirnov (K-S) test, the Chi-squared test, or the Population Stability Index (PSI)) to detect the data drift. In particular, the system may generate a first distribution of the first feature data and a second distribution of the second feature data and calculate, for each feature of the set of features within the first feature data, a corresponding first statistical metric, and for each feature of the set of features within the second feature data, a corresponding second statistical metric. Each first statistical metric and each second statistical metric may correspond to a feature in the set of features. For example, the system may perform a two-sample t-test for a numerical feature, such as ticket price, to calculate a t-statistic and corresponding p-value that indicate whether the means of the feature in the first and second datasets are statistically significantly different. The system may determine a proportion of the set of features that have a deviation between each first statistical metric and each corresponding second statistical metric meeting a deviation threshold, and, based on the proportion meeting a proportion threshold, determine that the data drift has occurred. For example, if the p-value falls below a predetermined significance threshold (e.g., 0.05), the system may determine that the feature has a statistically significant change in distribution. Similarly, for categorical features, the system may use a Chi-squared test to compare frequency distributions and assess statistical significance via the resulting p-value. If the proportion of features with corresponding values falling below the significant threshold represents a large enough proportion of the dataset, the system may assess that data drift has occurred within the dataset.

In some implementations, the system may update the second dataset to reflect an updated data distribution before computing a context deviation value to determine that the response from the artificial intelligence agent is deficient. In particular, in response to the trigger event and prior to determining the context deviation value, the system may retrieve a third plurality of parameters corresponding to the set of features within a third dataset. The set of features within the third dataset may have third feature data different than the second feature data. For example, if the second dataset was received at the time of the last trigger event, a population shift or other distribution change may have occurred in the features between the time of the data collection at the last trigger event and the current trigger event. The system may detect this change by detecting a data drift. Based on detecting a data drift between the second plurality of parameters and the third plurality of parameters, the system may replace the second plurality of parameters with the third plurality of parameters. For example, the system may update the parameters that the domain-specific agent will use as input for RAG when generating a response to compute a context deviation value by replacing the second set of parameters with the third set of parameters so that the second dataset now contains feature data from the third plurality of parameters.

If the system detects a data drift, the system may identify the features that have drifted and retrieve them from the second dataset. In particular, based on detecting the data drift, the system may retrieve, from the second dataset, a portion of the second feature data corresponding to the one or more features that have the different statistical distribution. In some implementations, this may be a proportion of the features less than the whole, while in some implementations, this may be a retrieval of the entire second dataset.

The system may retrain the artificial intelligence agent using the retrieved data from the second dataset. In particular, the system may retrain, using the portion of the second feature data within the second dataset, the artificial intelligence agent to no longer be deficient in the request category. In some implementations, if the system detects data drift on a large enough scale (e.g., exceeding a threshold number or proportion of features that are shifted), the system may retrain the artificial intelligence agent using the second dataset (e.g., the entirety of the second dataset). In particular, based on the drift metric exceeding a threshold, the system may retrain the artificial intelligence agent in the plurality of request categories using the second plurality of parameters. For example, if the system determines that more than 30% of the features have experienced statistically significant drift, the system may initiate a full retraining of the model using all available data from the second dataset so that the agent's outputs reflect the trends and distributions of the second dataset. In some implementations, if the data drift does not exceed the threshold, the system may retrain a part of the artificial intelligence agent (e.g., a proportion of the features less than the whole) using the corresponding part of the second feature dataset. For example, if data drift has occurred with the "Airline" feature, the system may retrain the model with the "Airline" feature data from the second dataset, so that the agent now incorporates "USPTO Airlines" into its outputs, while maintaining the training on the rest of the features of the first dataset.

In some implementations, the system may determine, based on a number of features that are present, that the artificial intelligence agent should be retrained in the request categories, while in some implementations the system may determine that the artificial intelligence agent should be retrained in all of the categories. The system may retrain, using the portion of the second feature data within the second dataset, the artificial intelligence agent to no longer be deficient in the request category. In particular, the system may detect a degree of data drift, for example, by computing the proportion of features of the dataset that have drifted. Based on determining that the degree of data drift meets a threshold, the system may retrain the artificial intelligence agent in the plurality of request categories using the second dataset. The system may, in some implementations, retrain the artificial intelligence agent on all categories in the dataset. For example, if the system detects that only a subset of features relevant to specific request categories has changed or exhibits significant drift, it may selectively retrain the artificial intelligence agent on those affected categories which can optimize resource usage and minimize downtime. Conversely, if the system identifies widespread changes across a majority of features or observes a substantial shift in the overall data distribution, it may trigger a comprehensive retraining of the artificial intelligence agent across all categories.

In some implementations, the system may detect that a data drift has not occurred from the first dataset to the second dataset. In such cases, the system may direct the request to a domain-specific artificial intelligence agent for execution. In particular, based on detecting that the first feature data within the first dataset has a matching statistical distribution to the second feature data within the second dataset, the system may determine that the data drift has not occurred and, based on determining that data drift has not occurred, the system may direct the request to a second domain-specific artificial intelligence agent. In some implementations, the system may notify an operator of the system that a context deviation that is not explainable by a data drift has occurred in the response from the artificial intelligence agent.

Figure 14:
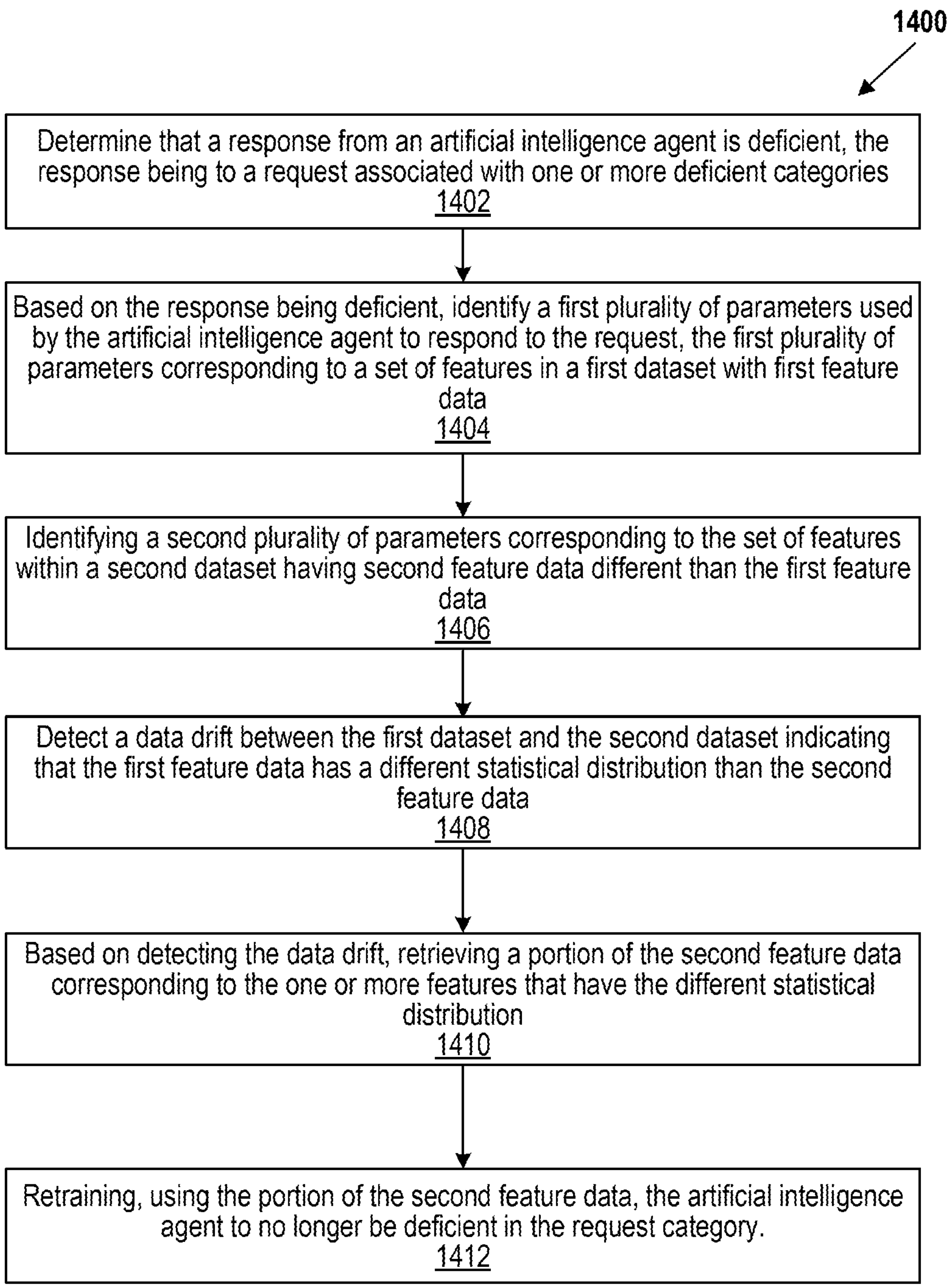
FIG. 14 shows a flowchart of the operations for patching and retraining artificial intelligence agents, in accordance with one or more implementations.

FIG. 14 shows a flowchart of the operations for patching and retraining artificial intelligence agents, in accordance with one or more implementations. For example, the system may use process 1400 (e.g., as implemented in one or more system components described above (e.g., in FIGS. 1 and 6)) in order to test and monitor artificial intelligence agents. The operations described may be performed on a user device, in a cloud system, or using a combination of both.

At 1402, the malfunction detection system 160 determines that a response from an artificial intelligence agent is deficient, the response being to a request associated with one or more deficient categories. For example, the system may use one or more of processors 610 to compare the categories of the request to a behavioral profile of the artificial intelligence agent to determine that one or more of the request categories match the deficient categories of the artificial intelligence agent.

At 1404, based on the response being deficient, the malfunction detection system 160 identifies a first plurality of parameters used by the artificial intelligence agent to respond to the request. The first plurality of parameters may correspond to a set of features in a first feature dataset with first feature data. For example, the system may use network interface 640 to retrieve the plurality of parameters from a network, for example, the cloud. In some examples, the system may retrieve the plurality of parameters from storage on the device, for example, from system memory 620.

At 1406, the malfunction detection system 160 identifies a second plurality of parameters corresponding to the set of features within a second feature dataset having second feature data different than the first feature data. For example, the second feature data may be newer than the first feature data. In some implementations, the system may use network interface 640 to retrieve the plurality of parameters from a network, for example, the cloud. In some examples, the system may retrieve the plurality of parameters from storage on the device, for example, from system memory 620.

In some implementations, determining that the response is deficient may include receiving a trigger event associated with the response received from the artificial intelligence agent. The trigger event may include a (pseudo) random selection of a response from the agent, an issue ticket raised by a user of the system (e.g., an operator or another artificial intelligence agent), an expiration of a time interval, or another trigger to check the response for deficiency. The system may receive a second response to the request executed by a domain-specific artificial intelligence agent. The domain-specific artificial intelligence agent may use the second plurality of parameters to execute the request. For example, the domain-specific artificial intelligence agent may retrieve feature data corresponding to the categories of the request and use the retrieved data to generate a response to the request. The system may determine a context deviation value between the response and the second response (e.g., machine learning model 702). The context deviation value may indicate a deviation in context between the first and second responses. If the context deviation value exceeds a threshold, the system may determine that the response from the artificial intelligence agent is deficient.

At 1408, the malfunction detection system 160 may detect a data drift between the first dataset and the second dataset indicating that the first feature data has a different statistical distribution than the second feature data. In some implementations, the system may use a machine learning model such as machine learning model 702 to calculate a drift metric from the first plurality of parameters to the second plurality of parameters. The machine learning model may be configured to determine a numerical distance between a first subset of the first feature data and a second subset of the second feature data. For example, the system may compute a vectorized distance between token embeddings derived from the first and second datasets, such as using cosine similarity or Euclidean distance between the mean embedding vectors. Alternatively, the system may calculate the absolute or squared difference between the means of corresponding features, or employ statistical distance measures such as the Wasserstein distance. In some examples, the system may calculate a difference between means of quantitative data or the mean number of appearances of categorical data points.

In some implementations, the system may use a statistical method to detect data drift. For example, the system may calculate a statistical metric for each feature of the set of features within the first feature data and a corresponding second statistical metric for each feature of the second feature data. The system may determine that a proportion of the set of features that have a deviation between each first and corresponding second statistical metric meets a threshold and determine that a data drift has occurred.

In some implementations, upon receiving the trigger event, the system may retrieve a third plurality of parameters corresponding to the set of features. The third plurality of parameters may correspond to a third dataset with feature data different from the second feature dataset. If the system detects that a data drift has occurred between the second and third pluralities of parameters, the system may replace the second plurality of parameters with the third plurality of parameters. For example, the trigger event may cause the system to retrieve an updated dataset corresponding to the set of features in the first and second plurality of parameters. The system may be configured to periodically test that the second dataset contains the most up-to-date data available. If the system discovers that the data distribution has changed since the last dataset was retrieved, the system may replace the outdated dataset with the updated dataset and proceed with data drift testing against the data used to train the model.

In some implementations, detecting a data drift between the first dataset and the second dataset includes comparing the first plurality of parameters and the second plurality of parameters (e.g., using one or more of processors 610 or machine learning model 702). In some examples, comparing the first and second pluralities of parameters may lead the system to detect that the first feature data and the second feature data have a matching statistical distribution. Based upon detecting that the distributions match, the system may determine that a data drift has not occurred. Based on determining that a data drift has not occurred, the system may route the request (e.g., a part of the request or all of the request) to be carried out by a domain-specific artificial intelligence agent and cause a transmission of an indication of a context deviation to an operator. The context deviation may represent the context deviation value between the response and the second response to the request.

At 1410, based on detecting the data drift, the malfunction detection system 160 retrieves a portion of the second feature data corresponding to the one or more features that have the different statistical distribution. For example, using one or more of processors 610 or machine learning model 702, the system may identify the features within the dataset that have feature data with drifted statistical distributions. In some implementations, the system may retrieve some features and feature data from the second dataset. In some implementations, the system may retrieve the entirety of the second dataset.

At 1412, the malfunction detection system may retrain (e.g., using one or more of processors 610), using the portion of the second feature data, the artificial intelligence agent to no longer be deficient in the request category. For example, the system may fine-tune the artificial intelligence agent by updating the model weights using only the feature data corresponding to the drifted features. In some implementations, if the data drift affects a substantial portion of the features or exceeds a threshold, the system may perform a full retraining of the artificial intelligence agent using the entirety of the second dataset. For example, the system may detect a degree of the data drift (e.g., a proportion of the features that have drifted feature data) and, based on determining that the degree of the data drift meets a threshold, the system may retrain the artificial intelligence agent in the plurality of request categories using the second dataset.

In some implementations, the system may detect and bag errors or inaccuracies generated by an artificial intelligence agent. The system may, based on a plurality of parameter combinations of parameters used by an artificial intelligence agent to respond to requests, generate a plurality of test requests for the artificial intelligence agent. In some examples, the parameters may include or be associated with datapoints, tokens, features, model weights, hyperparameters, training epochs, tokenization schemes, or configuration settings that influence the agent's behavior or output. These parameters may also encompass pre-processing rules, post-processing logic, or domain-specific constraints relevant to the categories being tested. The artificial intelligence agent may use the parameters by incorporating them as training data during model development or fine-tuning, leveraging them as retrieval keys or context sources for retrieval-augmented generation (RAG), or directly applying them as the operational parameters that may define the agent's architecture and/or inference behavior. In some implementations, the parameters may be dynamically adjusted or selected for the agent's performance for specific categories, requests, or operational environments. The system may use combinations of these parameters to generate the test requests. Each test request may be associated with one or more corresponding categories of a plurality of categories to be tested.

In some implementations, the system may determine a plurality of deficient categories (e.g., categories where a performance of the artificial intelligence agent is deficient) based on a plurality of test responses to the plurality of test requests. For example, the test requests may be transmitted to the artificial intelligence agent. The artificial intelligence agent may generate a set of test responses to the test requests by executing the test requests (e.g., in a sandbox or simulated environment). The deficient categories can be categories where a performance of the artificial intelligence agent is deficient (e.g., where a behavioral profile indicates that the artificial intelligence agent is deficient in the categories, or where a deviation value of a test response meets a deviation threshold). In some implementations, each deficient category may be associated with a corresponding subset of the parameters used by the artificial intelligence agent. For example, each deficient category may be associated with specific features, model weights, or configuration settings that may influence the agent's performance in that category, such as input tokens or domain-specific rules relevant to the category's tasks. In example category "identify calendar overlaps", the associated parameters may be the temporal parsing logic, entity recognition weights for date and time expressions, tokenization schemes for calendar data, or configuration settings that may control how overlapping events are detected and resolved.

In some implementations, the system may train a set of specialized artificial intelligence agents for responding to the requests associated with the plurality of deficient categories. Training artificial intelligence agents may involve preprocessing training data, selecting relevant features or parameters, configuring model architectures, optimizing model weights through iterative learning algorithms, and validating performance against benchmark datasets. In some implementations, each specialized artificial intelligence agent of the set of specialized artificial intelligence agents may be trained using one or more corresponding subsets of the parameters used by the artificial intelligence agent. For example, the system may select subsets of parameters that are most strongly correlated with the deficient categories, such as specific feature vectors, model weights, or domain-specific rules, and use these targeted subsets to train smaller, category-focused agents. This targeted training approach may enable each specialized agent to address the unique challenges or error patterns observed in its assigned category.

In some implementations, the system may train the artificial intelligence agents by determining training limits such as training cost, time, resource availability, or other training limits and creating training subsets of the parameters to use to train the specialized agents. For example, the subsets of the parameters may be determined by selecting parameters most relevant to the deficient categories, ranking parameters based on feature importance scores, clustering parameters according to similarity or domain relevance, or sampling parameters according to a predefined budget or constraint to enable more efficient use of available resources. In some implementations, the system may identify, based on training restrictions, a number of corresponding subsets of the parameters used by the artificial intelligence agent that are enabled to be used for training specialized artificial intelligence agents. The system may generate a plurality of training sets for training the specialized artificial intelligence agents, wherein each training set of the plurality of training sets comprises the number of corresponding subsets of the parameters used by the artificial intelligence agent. For example, based on training restrictions such as time availability, the system may create training subsets of the parameters including a smaller number of parameters to train smaller agents that are trained for a narrower set of reasoning domain areas. The system may train the set of specialized artificial intelligence agents based on the plurality of training sets. In some implementations, the training sets may be associated with deficient categories of the artificial intelligence agent.

In some implementations, the system may train specialized agents on data that is not used by the artificial intelligence agent. For example, the system may train specialized agents without using the parameters. The system may identify new training data that was not used to train the artificial intelligence agent and use it to generate a new plurality of parameters to use to train the set of specialized artificial intelligence agents. For example, the system may collect user interaction logs, domain-specific datasets, or publicly available repositories relevant to the deficient categories. The system may then generate synthetic data by applying data augmentation techniques, such as paraphrasing, random sampling, or simulation of domain-specific scenarios, or by leveraging generative models to create artificial examples that reflect the characteristics of the deficient categories or the existing data. The system may then preprocess this new data to extract features, generate updated model weights, or derive new configuration settings, and use these as the basis for training the specialized artificial intelligence agents. In another example, the system may use the parameters to generate synthetic data to train the specialized artificial intelligence agents. For example, the system may use the parameters as seed values or conditioning variables for a generative model, such as a variational autoencoder or a generative adversarial network, to produce new training samples that are statistically consistent with the original parameter distribution but introduce novel variations relevant to the specialized agent's domain. These synthetic samples may then be incorporated into the training pipeline to enhance the agent's ability to generalize to new or underrepresented scenarios.

In some implementations, the system may transmit a second plurality of test requests to each specialized artificial intelligence agent of the set of specialized artificial intelligence agents to determine one or more specialized artificial intelligence agents that are not deficient in a subset of the plurality of deficient categories. For example, the system may use responses of the specialized artificial intelligence agents to the test for categories where the specialized artificial intelligence agents are deficient. Categories where each specialized artificial intelligence agent is not found to be deficient (e.g., are found to be proficient) may include a subset of the plurality of deficient categories. In some implementations, each test request of the second plurality of test requests may correspond to a deficient category of the plurality of deficient categories. For example, the system may generate targeted test scenarios or benchmark tasks for each deficient category and evaluate the specialized artificial intelligence agent's responses against performance criteria or ground truth responses. In some implementations, if a specialized agent's responses meet or exceed the proficiency threshold for a given category, that category may be marked as proficient for that agent. In some implementations, if a specialized agent's responses do not meet or exceed the proficiency threshold for a given category, that category may be marked as deficient for that agent.

In some implementations, the system may use a generative machine learning model to create the second plurality of test requests. In particular, the system may input the plurality of deficient categories into a generative machine learning model with a command to generate category requests for the plurality of deficient categories. For example, the system may provide prompts or templates describing the deficient categories (e.g., including metadata, features, or other category-level information) to a large language model or other generative model, which then produces test requests that reflect the types of user queries, scenarios, or tasks associated with each deficient category. The generated test requests may be tailored to cover a range of difficulty levels, edge cases, or domain-specific nuances.

Based on a second plurality of responses to the second plurality of test requests (e.g., responses to the test requests executed by the specialized artificial intelligence agents), the system may select (1) a first specialized artificial intelligence agent of the set of specialized artificial intelligence agents to respond to the requests associated with a first set of the plurality of deficient categories and (2) a second specialized artificial intelligence agent of the set of specialized artificial intelligence agents to respond to the requests associated with a second plurality of deficient categories. In some implementations, the first and the second set are different. For example, the first specialized artificial intelligence agent may be proficient in a first 60% of the deficient categories, while the second specialized artificial intelligence agent may be proficient in a second 30% of the deficient categories. In some examples, both artificial intelligence agents may be proficient in some of the categories. The specialized artificial intelligence agents may then be assigned to respond to requests associated with their respective proficient categories. In some implementations, the system may select any whole number of specialized artificial intelligence agents to respond to the whole number of pluralities of deficient categories. In some implementations, the system may use optimization algorithms, such as assignment or matching algorithms, to allocate categories to agents in a way that increases overall system proficiency and reduces overlap or redundancy. In cases where multiple agents are proficient in the same category, the system may implement load balancing strategies, such as round-robin assignment or performance-based selection, to distribute incoming requests efficiently. Additionally, the system may monitor the ongoing performance of each agent in production and trigger reassignment or retraining if a change in proficiency is detected in any category.

In some implementations, selecting the first and second specialized artificial intelligence agents involves selecting the specialized artificial intelligence agents that are proficient in the largest portion of the deficient categories. For example, the system may determine that the first specialized artificial intelligence agent covers a largest number of deficient categories, which in some implementations correspond to the first set of the plurality of deficient categories. The system may determine that the second specialized artificial intelligence agent covers a second largest number of deficient categories, which in some implementations correspond to the second set of deficient categories and which comprises different deficient categories than the first set of deficient categories. For example, the system may select a pair of specialized artificial intelligence agents which are not deficient (e.g., are proficient) in a largest combined total of the deficient categories. In some implementations, the specialized artificial intelligence agents may be selected for coverage while accounting for overlap, computational cost, or response latency across the deficient categories. In some implementations, the selection may also consider agent performance metrics such as accuracy, reliability, or resource efficiency for each category. In some implementations, the system may select any whole number of specialized artificial intelligence agents necessary to enable coverage of deficient categories, for example, assigning multiple agents to overlapping categories or dynamically reallocating agents based on real-time performance data or changing operational requirements.

In some implementations, the system may generate a configuration for the artificial intelligence agent that indicates that the first specialized artificial intelligence agent is or should be used for the first set of the plurality of deficient categories and that the second specialized artificial intelligence agent is or should be used for the second set of the plurality of deficient categories. For example, the system may create or add to a behavioral profile of the artificial intelligence agent indicating that the agent should use the first and second specialized agents for responding to requests corresponding to the first and second sets of deficient categories. The artificial intelligence agent may use responses from the specialized agents to modify requests, modify responses, inform responses (e.g., using responses from the specialized agents as RAG sources), or may entirely route deficient requests to the specialized agent. Requests that are routed to the specialized agents may include some deficient categories and some other categories or all deficient categories.

FIG. 15 shows an exemplary configuration 1500 for an artificial intelligence agent for bagging errors with specialized artificial intelligence agents, in accordance with one or more implementations. In some implementations, a behavioral profile can take the form of a configuration. The configuration 1500 can be in the form of a data structure, configuration file, database record, application programming interface (API) specification, or another suitable information storage structure. The configuration 1500 can include information about the behavior of an artificial intelligence agent in a number of categories or related agents that can be used to supplement the execution of requests to the artificial intelligence agent. The configuration can be associated with the artificial intelligence agent, for example, by storing a reference to the configuration within the agent's initialization parameters, linking the configuration via an identifier in a database, embedding the configuration directly within the agent's runtime environment, or dynamically loading the configuration through an API call or configuration management service at deployment or inference time.

The configuration 1500 can include an agent ID, a list of proficient categories and their associated metadata and feature payloads, a list of deficient categories and their associated metadata and feature payloads, a list of specialized agents for carrying out parts of requests associated with specific categories, or any other referential information corresponding to the artificial intelligence agent. The agent ID can uniquely identify the artificial intelligence agent within a system, enable cross-referencing with other system components or databases, facilitate tracking of agent performance and updates, and support assignment or retrieval of configurations, logs, or operational metrics associated with the agent.

The list of proficient categories can be a set of categories that fall within the reasoning domain areas of the artificial intelligence agent. The list of deficient categories can be a set of categories that the artificial intelligence agent may field requests for but be unequipped to execute. For example, an artificial intelligence agent built for booking flights may not be able to retrieve calendars of multiple family members to find an overlapping opening of time. Comparing calendar openings may be a deficient category of the artificial intelligence agent, while retrieving flight schedules may be a proficient category of the artificial intelligence agent. In some implementations, the set of deficient categories and the set of proficient categories may be complementary subsets of a set of categories pertaining to a service area or domain such as travel booking, self-driving car training, or other domain area.

The lists of proficient and deficient categories may further include metadata and feature payload indicators. The metadata may include user-specific parameters, feature identifiers for training features that make up the category, an indication of a deployed artificial intelligence agent known to provide validated responses in the deficient category, or other information associated with the category and its features. The feature payload may be a pointer to a memory location, file path, database entry, or API endpoint where the actual feature data, serialized feature vectors, or relevant training samples are stored.

The list of specialized agents may include the agent IDs of other agents to be used for responding to parts of or entire requests that fall within the deficient categories of the artificial intelligence agents. For example, the specialized agents may include the IDs of agents trained in the deficient categories of the artificial intelligence agent. These agents may include domain-specific agents used to respond to portions of requests by processing sub-requests, agents used to re-route requests, or specialized agents trained to supplement the deficient categories of the requests.

Figure 16:
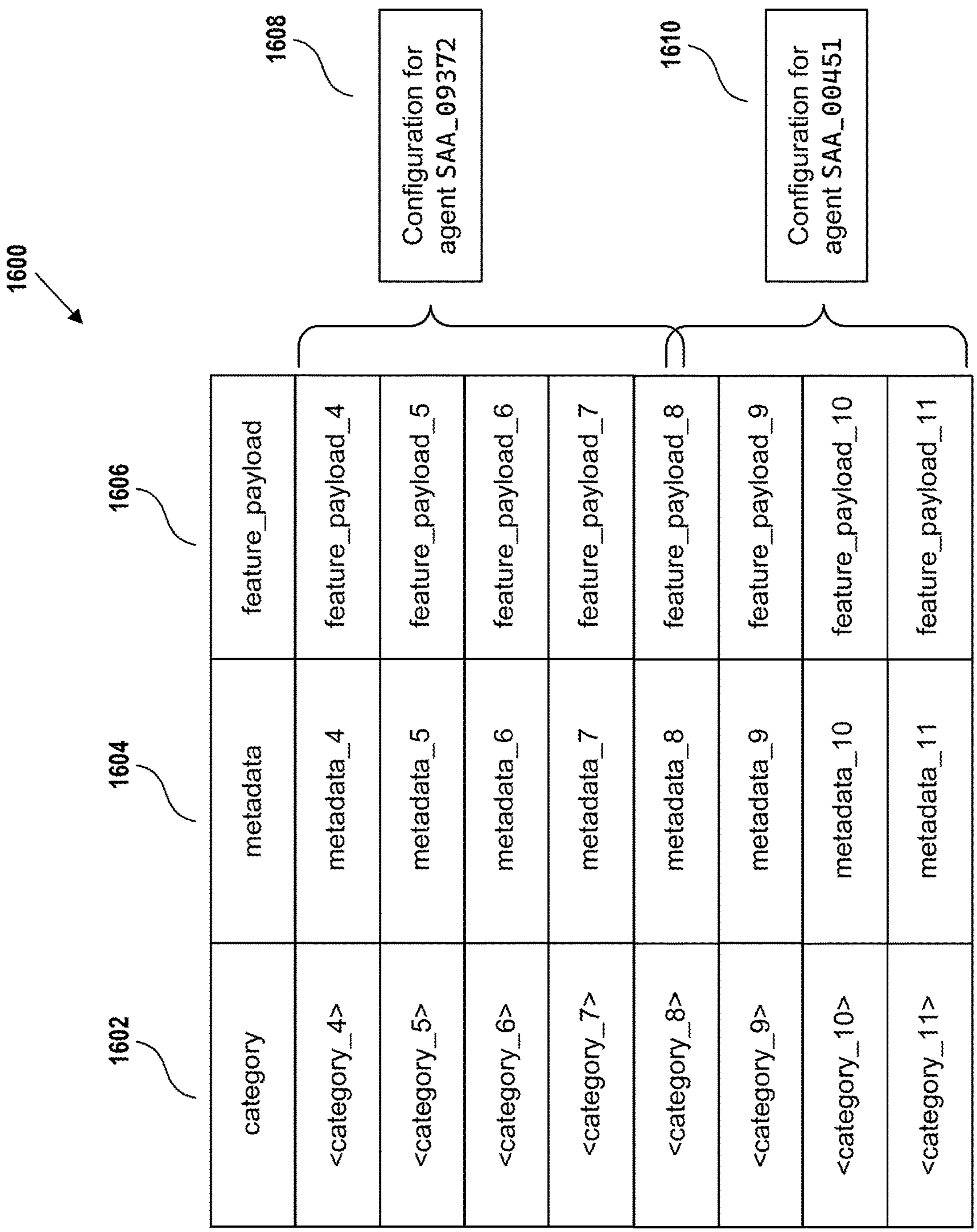
FIG. 16 shows an exemplary data structure for storing a plurality of categories for bagging errors with specialized artificial intelligence agents, in accordance with one or more implementations.

FIG. 16 shows an exemplary data structure 1600 for storing a plurality of categories for bagging errors with specialized artificial intelligence agents, in accordance with one or more implementations. Data structure 1600 includes a "category" column 1602, a "metadata" column 1604, and a feature_payload column 1606. In some implementations, the "deficient category" information from the configuration 1500 may be stored in a data structure such as data structure 1600 The deficient categories may be added to configurations, such as behavioral profiles, for specialized agents trained to respond to requests in the deficient categories.

In the example of FIG. 16, categories 4-8, which may be deficient categories of an artificial intelligence agent, may be added to the configuration 1608 for one specialized agent, while categories 8-11 may be added to the configuration 1610 for another specialized agent. In some examples, the specialized agents may have been trained using data associated with their respective sets of categories and selected to respond to requests associated with the categories indicated by their configurations. In some implementations, specialized agents may be selected for requests pertaining to the same category, such as category 8 in the example of FIG. 16. In some implementations, selected specialized agents may not cover all deficient categories of the artificial intelligence agent.

In some implementations, the system may determine that the set of specialized artificial intelligence agents does not cover (e.g., is not proficient in) a sufficient number of deficient categories and train another set of specialized artificial intelligence agents to cover additional deficient categories. In particular, the system may determine that the first specialized artificial intelligence agent and the second specialized artificial intelligence agent do not cover all of the plurality of deficient categories. The system may identify a subset of the plurality of deficient categories that has not been covered and determine corresponding subsets of parameters used by the artificial intelligence agent for the subset of the plurality of deficient categories. The system may train a new specialized artificial intelligence agent based on the corresponding subsets of the parameters. For example, the system may aggregate the uncovered deficient categories, extract the parameters (e.g., relevant features, model weights, or configuration settings associated with those categories), and initiate a targeted training process to develop a new specialized agent optimized for those specific deficiencies. The system can use the parameters, other parameters, or synthetic data based off the parameters for the training process. In some implementations, the system may iteratively repeat this process, training additional agents as needed until the deficient categories are adequately covered, or until a predefined performance threshold is met for each category.

Figure 17:
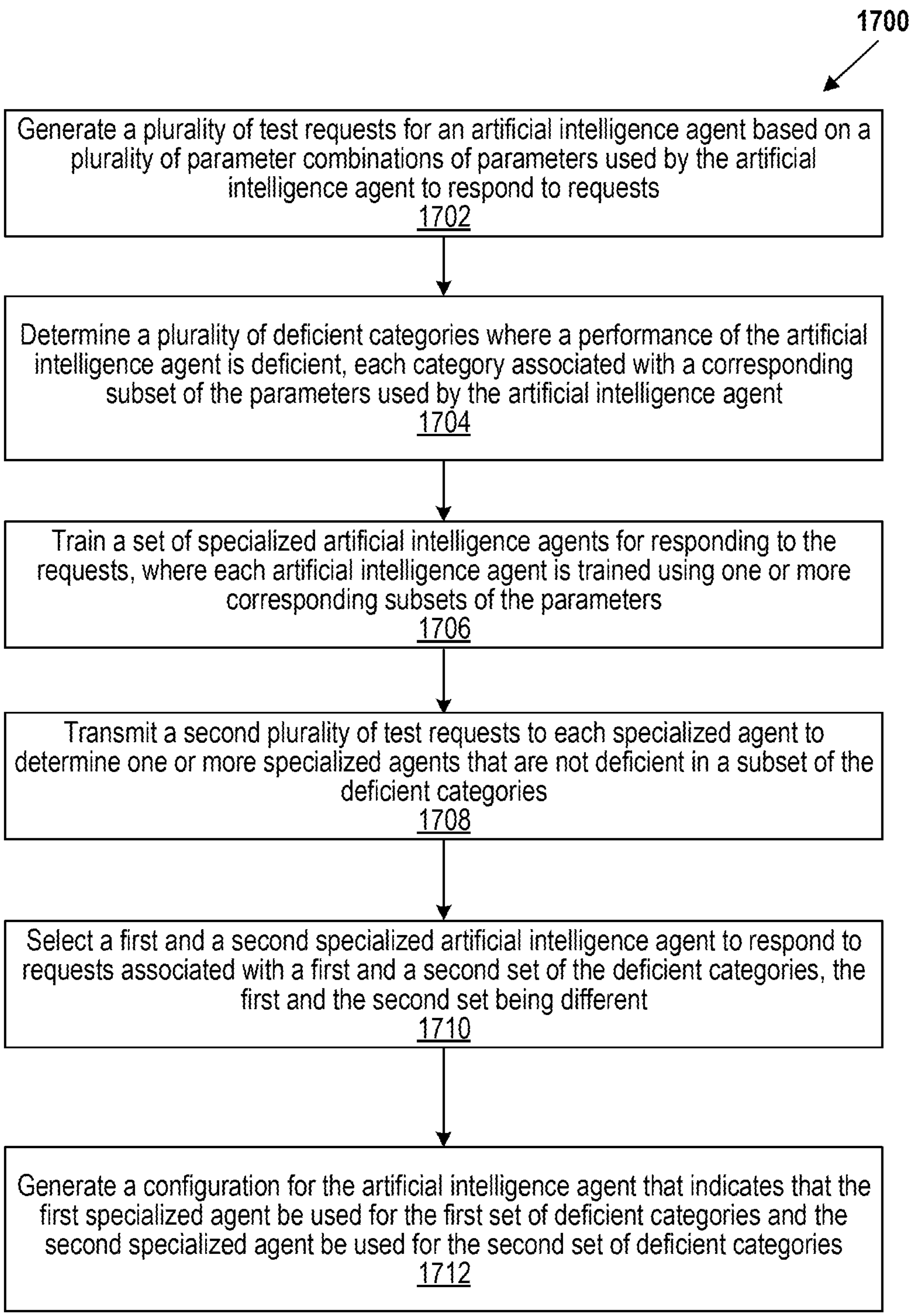
FIG. 17 shows a flowchart of the operations for bagging errors with specialized artificial intelligence agents, in accordance with one or more implementations.

FIG. 17 shows a flowchart of the operations for bagging errors with specialized artificial intelligence agents, in accordance with one or more implementations. For example, the system may use process 1700 (e.g., as implemented in one or more system components described above (e.g., in FIGS. 1 and 6)) in order to bag errors with specialized artificial intelligence agents. The operations described may be performed on a user device, in a cloud system, or using a combination of both.

At operation 1702, the malfunction detection system 160 generates a plurality of test requests for an artificial intelligence agent based on a plurality of parameter combinations of parameters used by the artificial intelligence agent to respond to requests. For example, the system may systematically vary input features, model hyperparameters, or other variables to create test requests. Each test request may be constructed to evaluate the agent's behavior under different parameter settings, enabling the detection of performance anomalies, edge cases, or deficiencies. The system may use one or more of processors 610 or machine learning model 702 to generate the test requests.

At operation 1704, the malfunction detection system 160 determines a plurality of deficient categories where a performance of the artificial intelligence agent is deficient, each category being associated with a corresponding subset of the parameters used by the artificial intelligence agent. For example, the system may analyze the agent's responses to the test requests and identify categories where the agent's accuracy, confidence score, or other performance metrics fall below a predefined threshold, or reference the agent's configuration or behavioral profile for indication of deficient categories. The system may use one or more of processors 610 or machine learning model 702 to determine the plurality of deficient categories.

At operation 1706, the malfunction detection system 160 trains a set of specialized artificial intelligence agents for responding to the requests, where each artificial intelligence agent is trained using one or more corresponding subsets of the parameters. For example, the system may partition the deficient categories identified in the previous operation and assign each corresponding subset of parameters to a dedicated specialized agent. Each agent may be trained on the training data relevant to its assigned subset. The system may use one or more of processors 610 or machine learning model 702 to train the set of specialized agents.

At operation 1708, the malfunction detection system 160 transmits a second plurality of test requests to each specialized agent to determine one or more specialized agents that are not deficient in a subset of the deficient categories. For example, the system may generate targeted test requests corresponding to the parameter subsets associated with each deficient category and send these test requests to the relevant specialized agents. Agents that meet performance thresholds for their respective test cases may be selected as proficient (e.g., not deficient) for those categories. The system may use one or more of processors 610 or machine learning model 702 to transmit the second plurality of test requests and determine one or more specialized agents that are not deficient in a subset of the deficient categories.

At operation 1710, the malfunction detection system 160 selects a first and a second specialized artificial intelligence agent to respond to requests associated with a first and second set of the deficient categories, the first and second set being different. For example, the system may select a specialized agent that demonstrated a broadest performance in the first set of deficient categories to handle requests related to those categories, while assigning a different specialized agent to handle requests in a different set of areas. In some implementations, the system may select more or fewer than two specialized agents. The system may use one or more of processors 610 or machine learning model 702 to select specialized artificial intelligence agents.

At operation 1712, the malfunction detection system 160 generates a configuration for the artificial intelligence agent that indicates that the first specialized agent be used for the first set of deficient categories and the second specialized agent be used for the second set of deficient categories. For example, the system may create or update a configuration file, data structure, behavioral profile, or database entry that maps each deficient category or group of categories to the corresponding specialized agent. The system may use one or more of processors 610 or machine learning model 702 to generate a configuration.

The above-described implementations of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated implementations:

A1. A method, the method comprising: determining a plurality of parameters used by an artificial intelligence agent to respond to requests, where the plurality of parameters corresponds to data that was used to train the artificial intelligence agent, and wherein the artificial intelligence agent is associated with a computer-executable operation set configured to be autonomously executed by the artificial intelligence agent on a software application set; generating, based on the plurality of parameters, a plurality of parameter combinations for testing the artificial intelligence agent, wherein each of the plurality of parameter combinations comprises a corresponding set of feature identifiers for features used to train the artificial intelligence agent; generating, based on the plurality of parameter combinations, a plurality of test requests for the artificial intelligence agent, wherein each request of the plurality of test requests comprises corresponding feature data for testing the artificial intelligence agent, and wherein each test request is associated with a corresponding category of a plurality of categories to be tested; transmitting the plurality of test requests to the artificial intelligence agent to obtain a plurality of test responses, wherein each test response of the plurality of test responses is associated with the corresponding category of each test request; transmitting the plurality of test requests to one or more deployed artificial intelligence agents known to provide validated responses to the requests associated with a corresponding set of categories to obtain a plurality of control responses to the plurality of test requests; determining, using a machine learning model for each pair of a control response and a test response, a corresponding context differential that indicates a deviation value between each test response and a corresponding control response; and determining, based on each context differential, one or more categories where a performance of the artificial intelligence agent is deficient, wherein the performance is deficient when the deviation value meets a deviation threshold.

A2. The method of any one of the preceding implementations, further comprising determining, based on each context differential, a corresponding categorical deviation value associated with each category of the plurality of categories; and determining, based on corresponding categorical deviation values, a set of categories having one or more unpredictable categories, wherein the set of categories having the one or more unpredictable categories comprises one or more corresponding categorical deviation meeting a categorical deviation threshold.

A3. The method of any one of the preceding implementations, wherein generating the plurality of parameter combinations for testing the artificial intelligence agent comprises: generating a first plurality of parameter combinations with a first number of parameters; and based on determining that a first deviation value corresponding to a first request associated with the first plurality of parameter combinations does not meet the deviation threshold, generating a second plurality of parameter combinations, wherein each parameter combination of the second plurality of parameter combinations comprises one or more additional parameters.

A4. The method of any one of the preceding implementations, further comprising: based on determining the one or more categories where the artificial intelligence agent is deficient, retrieving feature data corresponding to the one or more categories; and generating, using the feature data corresponding to the one or more categories, synthetic data for training the artificial intelligence agent in relation to the one or more categories, wherein the synthetic data comprises feature identifiers matching the feature data.

A5. The method of any one of the preceding implementations, further comprising: using the synthetic data, retraining one or more of: the artificial intelligence agent or a deployed artificial intelligence agent tasked with monitoring the artificial intelligence agent; transmitting a set of test requests corresponding to the one or more categories where the artificial intelligence agent is deficient to the one or more deployed artificial intelligence agents and to the artificial intelligence agent to obtain a second plurality of control responses and a second plurality of test responses that are associated with the one or more categories; generating, based on the second plurality of test responses and the second plurality of control responses, a second plurality of context differentials corresponding to the one or more categories; and determining, based on each context differential of the second plurality of context differentials, that the artificial intelligence agent or the deployed artificial intelligence agent is no longer deficient with respect to a category of the one or more categories.

A6. The method of any one of the preceding implementations, further comprising: retrieving a list of the one or more categories where the artificial intelligence agent is deficient; and generating a behavioral profile for the artificial intelligence agent comprising metadata associated with the one or more categories.

A7. The method of any one of the preceding implementations, further comprising: retrieving, from the behavioral profile, the one or more categories where the artificial intelligence agent is deficient, wherein each category of the one or more categories is associated a corresponding deployed artificial intelligence agent; generating one or more test requests associated with each category of the one or more categories; and transmitting to the artificial intelligence agent the plurality of test requests; and determine whether the artificial intelligence agent uses the one or more deployed artificial intelligence agents to execute the one or more test requests.

A8. A tangible, non-transitory, computer-readable medium storing instructions that, when executed by a data processing apparatus, cause the data processing apparatus to perform operations comprising those of any of implementations A1-A7.

A9. A system comprising one or more processors; and memory storing instructions that, when executed by the processors, cause the processors to effectuate operations comprising those of any of implementations A1-A7.

A10. A system comprising means for performing any of implementations A1-A7.

B1. A method, the method comprising: receiving a request for an artificial intelligence agent; determining, based on the request, a request context comprising a plurality of categorical parameters associated with the request, wherein the plurality of categorical parameters indicates one or more categories associated with the request, and wherein each category of the one or more categories is associated with a corresponding reasoning domain area of a plurality of reasoning domain areas; comparing, using an artificial intelligence model, a behavioral profile associated with the artificial intelligence agent with the plurality of categorical parameters associated with the request to obtain one or more deficient categories associated with the request, wherein the one or more deficient categories of the request correspond to one or more reasoning domain areas where an output of the artificial intelligence agent is known to have an agent output metric not satisfying a threshold; based on the one or more deficient categories of the request, determining a first domain-specific agent of a plurality of domain-specific artificial intelligence agents, wherein the first domain-specific agent is known to provide valid responses in a set of deficient categories; modify, based on a reasoning domain area associated with a deficient category of the one or more deficient categories, a first portion of the request to be executed by the first domain-specific agent, wherein the first portion of the request comprises a portion of the request related to the reasoning domain area associated with the deficient category; generating a modified request comprising a domain-specific response from the first domain-specific agent as a replacement for the first portion of the request; and causing the modified request to be executed by the artificial intelligence agent.

B2. The method of any one of the preceding implementations, wherein modifying the first portion of the request to be executed by the first domain-specific agent further comprises: using the one or more deficient categories associated with the request, generating one or more sub-requests comprising one or more portions of the request, with each portion corresponding to the deficient category of the one or more deficient categories, wherein a first sub-request of the one or more sub-requests comprises the first portion of the request; and transmitting the one or more sub-requests to one or more domain-specific agents, wherein a subset of one or more sub-requests is transmitted to the first domain-specific agent.

B3. The method of any one of the preceding implementations, wherein each sub-request of the one or more sub-requests is associated with corresponding metadata indicating that an associated sub-request corresponds to at least one of the one or more deficient categories, and wherein each response to the one or more sub-requests replaces a corresponding portion of the request.

B4. The method of any one of the preceding implementations, further comprising: receiving a response to the modified request executed by the artificial intelligence agent; determining, using a machine learning model trained to measure a degree of accuracy of agent responses to requests, an accuracy parameter corresponding to the response to the modified request; and determining whether the accuracy parameter corresponding to the response meets an accuracy threshold.

B5. The method of any one of the preceding implementations, further comprising: based on obtaining the one or more deficient categories of the request, determining that the one or more deficient categories of the request are included in the behavioral profile of a second domain-specific agent indicating that the second domain-specific agent is known to provide accurate responses to the one or more deficient categories; transmitting the request to the second domain-specific agent to obtain a response; and adding the request and the response to a dataset for training the artificial intelligence agent, wherein the response is associated with the request within the dataset.

B6. The method of any one of the preceding implementations, wherein generating the modified request further includes: based on the domain-specific response from the first domain-specific agent, generating response data corresponding to the one or more reasoning domain areas associated with the first portion of the request, wherein the response data includes structured data extracted from the domain-specific response from the first domain-specific agent; and modifying the request to incorporate the response data, wherein the response data replaces one or more portions of the request corresponding to the one or more deficient categories.

B7. The method of any one of the preceding implementations, further comprising: receiving a response to the modified request executed by the artificial intelligence agent; determining, using a context similarity machine learning model, whether a response context of the response matches one or more bias contexts retrieved from a bias database, wherein the context similarity machine learning model is trained to measure a degree of context similarity between a particular bias context from the bias database and a particular response; and based on determining that the response context matches a bias context from the bias database, generating an indication of a bias detected within the response.

B8. The method of any one of the preceding implementations, further comprising: receiving a user behavioral profile associated with a user that generated the request; determining whether the bias detected within the response matches a user-preferred bias within the user behavioral profile; based on determining that the bias detected within the response does not match the user-preferred bias within the user behavioral profile, modifying the request with a set of instructions to the artificial intelligence agent to avoid the bias, wherein the set of instructions comprise the indication of the bias; and based on determining that the bias detected within the response matches the user-preferred bias within the user behavioral profile, refraining from modifying the request.

B9. A tangible, non-transitory, computer-readable medium storing instructions that, when executed by a data processing apparatus, cause the data processing apparatus to perform operations comprising those of any of implementations B1-B8.

B10. A system comprising one or more processors; and memory storing instructions that, when executed by the processors, cause the processors to effectuate operations comprising those of any of implementations B1-B8.

B11. A system comprising means for performing any of implementations B1-B8.

C1. A method, the method comprising: determining that a response from an artificial intelligence agent is deficient, wherein the response corresponds to a request sent to the artificial intelligence agent, and wherein the response is deficient if the request is associated with one or more deficient categories; based on the response being deficient, identifying a first plurality of parameters used by the artificial intelligence agent to respond to the request, wherein the first plurality of parameters corresponds to a set of features within a first dataset with first feature data, and wherein the first dataset was used in training the artificial intelligence agent in one or more categories corresponding to the request; identifying a second plurality of parameters corresponding to the set of features within a second dataset, the set of features having second feature data different than the first feature data; detecting, based on comparing the first plurality of parameters with the second plurality of parameters, a data drift between the first dataset and the second dataset, wherein the data drift indicates that the first feature data corresponding to one or more features of the set of features within the first dataset has a different statistical distribution than the second feature data corresponding to the one or more features of the set of features within the second dataset; based on detecting the data drift, retrieving, from the second dataset, a portion of the second feature data corresponding to the one or more features that have the different statistical distribution; and retraining, using the portion of the second feature data within the second dataset, the artificial intelligence agent to no longer be deficient in the request category.

C2. The method of any one of the preceding implementations, wherein determining that the response from the artificial intelligence agent is deficient further comprises: receiving a trigger event associated with the response received from the artificial intelligence agent; receiving a second response to the request executed by a domain-specific artificial intelligence agent, wherein the domain-specific artificial intelligence agent uses the second plurality of parameters to execute the request; determining, using a artificial intelligence model, a context deviation value between the response and the second response, wherein the context deviation value indicates a deviation between the response and the second response; and based on determining that the context deviation value exceeds a predetermined deviation threshold, determining that the response from the artificial intelligence agent is deficient.

C3. The method of any one of the preceding implementations, further comprising: in response to the trigger event and prior to determining the context deviation value, retrieving a third plurality of parameters corresponding to the set of features within a third dataset, the set of features having third feature data different than the second feature data; and based on detecting the data drift between the second plurality of parameters and the third plurality of parameters, replacing the second plurality of parameters with the third plurality of parameters.

C4. The method of any one of the preceding implementations, further comprising: detecting a degree of the data drift; and based on determining that the degree of the data drift meets a threshold, retraining the artificial intelligence agent in the plurality of request categories using the second dataset.

C5. The method of any one of the preceding implementations, wherein detecting the data drift further comprises: calculating, using a artificial intelligence model, a drift metric from the first plurality of parameters to the second plurality of parameters, wherein the artificial intelligence model is configured to determine a numerical distance between a first subset of the first feature data and a second subset of the second feature data; and based on the drift metric exceeding a threshold, retraining the artificial intelligence agent in the plurality of request categories using the second plurality of parameters.

C6. The method of any one of the preceding implementations, wherein detecting the data drift further comprises: generating a first distribution of the first feature data and a second distribution of the second feature data; calculating, for each feature of the set of features within the first feature data, a corresponding first statistical metric, and for each feature of the set of features within the second feature data, a corresponding second statistical metric, wherein each first statistical metric and each second statistical metric correspond to a feature in the set of features; determining a proportion of the set of features that have a deviation between each first statistical metric and each corresponding second statistical metric meeting a deviation threshold; and based on the proportion meeting a proportion threshold, determining that the data drift has occurred.

C7. The method of any one of the preceding implementations, wherein comparing the first plurality of parameters to the second plurality of parameters further comprises: based on detecting that the first feature data within the first dataset has a matching statistical distribution to the second feature data within the second dataset, determining that the data drift has not occurred; based on determining that the data drift has not occurred, directing the request to a second domain-specific artificial intelligence agent; and causing transmission of an indication of a context deviation to an operator.

C8. A tangible, non-transitory, computer-readable medium storing instructions that, when executed by a data processing apparatus, cause the data processing apparatus to perform operations comprising those of any of implementations C1-C7.

C9. A system comprising one or more processors; and memory storing instructions that, when executed by the processors, cause the processors to effectuate operations comprising those of any of implementations C1-C7.

C10. A system comprising means for performing any of implementations C1-C7.

D1. A method, the method comprising: generating, based on a plurality of parameter combinations of parameters used by an artificial intelligence agent to respond to requests, a plurality of test requests for the artificial intelligence agent, wherein each test request is associated with a corresponding category of a plurality of categories to be tested; determining, based on a plurality of test responses to the plurality of test requests, a plurality of deficient categories where a performance of the artificial intelligence agent is deficient, and wherein each deficient category of the plurality of deficient categories is associated with a corresponding subset of the parameters used by the artificial intelligence agent; training a set of specialized artificial intelligence agents for responding to the requests associated with the plurality of deficient categories, wherein each specialized artificial intelligence agent of the set of specialized artificial intelligence agents is trained using one or more corresponding subsets of the parameters used by the artificial intelligence agent; transmitting a second plurality of test requests to each specialized artificial intelligence agent of the set of specialized artificial intelligence agents to determine one or more specialized artificial intelligence agents that are not deficient in a subset of the plurality of deficient categories, wherein each test request of the second plurality of test requests corresponds to a deficient category of the plurality of deficient categories; selecting, based on a second plurality of responses to the second plurality of test requests, (1) a first specialized artificial intelligence agent of the set of specialized artificial intelligence agents to respond to the requests associated with a first set of the plurality of deficient categories, and (2) a second specialized artificial intelligence agent of the set of specialized artificial intelligence agents to respond to the requests associated with a second set of the plurality of deficient categories, wherein the first set and the second set are different; and generating a configuration for the artificial intelligence agent that indicates that the first specialized artificial intelligence agent be used for the first set of the plurality of deficient categories, and that the second specialized artificial intelligence agent be used for the second set of the plurality of deficient categories.

D2. The method of any one of the preceding implementations, wherein training the set of specialized artificial intelligence agents for responding to the requests associated with the plurality of deficient categories further comprises: identifying, based on training restrictions, a number of corresponding subsets of the parameters used by the artificial intelligence agent that are enabled to be used for training specialized artificial intelligence agents; generating a plurality of training sets for training the specialized artificial intelligence agents, wherein each training set of the plurality of training sets comprises the number of corresponding subsets of the parameters used by the artificial intelligence agent; and training the set of specialized artificial intelligence agents based on the plurality of training sets.

D3. The method of any one of the preceding implementations, wherein selecting the first specialized artificial intelligence agent and the second specialized artificial intelligence agent further comprises: determining that the first specialized artificial intelligence agent covers a largest number of deficient categories, wherein the largest number of deficient categories corresponds to the first set of the plurality of deficient categories; determining that the second specialized artificial intelligence agent covers a second largest number of deficient categories, wherein the second largest number of deficient categories corresponds to the second set of the plurality of deficient categories, and wherein the first set of the plurality of deficient categories and the second set of the plurality of deficient categories comprise different deficient categories; and selecting the first specialized artificial intelligence agent and the second specialized artificial intelligence agent.

D4. The method of any one of the preceding implementations, wherein training the set of specialized artificial intelligence agents for responding to the requests associated with the plurality of deficient categories further comprises: identifying new training data that was not used to train the artificial intelligence agent; generating, using the new training data, a new plurality of parameters; and training the set of specialized artificial intelligence agents using the new plurality of parameters.

D5. The method of any one of the preceding implementations, further comprising: determining that the first specialized artificial intelligence agent and the second specialized artificial intelligence agent do not cover all of the plurality of deficient categories; identifying, a subset of the plurality of deficient categories that has not been covered by the first specialized artificial intelligence agent and the second specialized artificial intelligence agent; determining corresponding subsets of the parameters used by the artificial intelligence agent for the subset of the plurality of deficient categories; and training a new specialized artificial intelligence agent based on the corresponding subsets of the parameters used by the artificial intelligence agent for the subset of the plurality of deficient categories.

D6. The method of any one of the preceding implementations, further comprising updating the configuration for the artificial intelligence agent that indicates that the new specialized artificial intelligence agent be used for the subset of the plurality of deficient categories.

D7. The method of any one of the preceding implementations, further comprising: inputting the plurality of deficient categories into a generative machine learning model with a command to generate category requests for the plurality of deficient categories; and receiving the second plurality of test requests from the generative machine learning model.

D8. A tangible, non-transitory, computer-readable medium storing instructions that, when executed by a data processing apparatus, cause the data processing apparatus to perform operations comprising those of any of implementations D1-D7.

D9. A system comprising one or more processors; and memory storing instructions that, when executed by the processors, cause the processors to effectuate operations comprising those of any of implementations D1-D7.

D10. A system comprising means for performing any of implementations D1-D7.

What is claimed is:

1. One or more non-transitory computer-readable media storing instructions thereon for request execution by artificial intelligence agents, wherein the instructions cause one or more processors to:

receive a request comprising a prompt for generation of a response using an artificial intelligence agent deployed on a computing device;

determine, based on the request, a request context comprising a plurality of categorical parameters associated with the request, wherein the plurality of categorical parameters indicates one or more categories associated with the request, and wherein each category of the one or more categories is associated with a corresponding reasoning domain area of a plurality of reasoning domain areas;

compare, using an artificial intelligence model, a behavioral profile associated with the artificial intelligence agent with the plurality of categorical parameters associated with the request to obtain one or more deficient categories associated with the request, wherein the one or more deficient categories of the request correspond to one or more reasoning domain areas where an output of the artificial intelligence agent has been measured to have an agent output metric not satisfying a threshold;

compare a plurality of behavior profiles associated with a plurality of artificial intelligence agents with the one or more deficient categories;

determine, based on the comparing, that the one or more deficient categories are included in a first behavioral profile of a first domain-specific agent indicating that the first domain-specific agent is measured, based on an accuracy parameter meeting an accuracy threshold, to provide valid responses to the one or more deficient categories;

modify, based on a reasoning domain area associated with a deficient category of the one or more deficient categories, a first portion of the request to be executed by the first domain-specific agent, wherein the first portion of the request comprises a portion of the request related to the reasoning domain area associated with the deficient category;

transmit the first portion of the request to the first domain-specific agent to obtain a domain-specific response;

modify the request to incorporate the domain-specific response, wherein the domain-specific response replaces one or more portions of the request corresponding to the one or more deficient categories to address the one or more deficient categories;

generate a modified request comprising a modified prompt for generating the response and comprising the domain-specific response from the first domain-specific agent as a replacement for the first portion of the request; and cause the modified request to be executed by the artificial intelligence agent deployed on the computing device, wherein execution of the modified request refines processing operations on the computing device for reducing a reasoning-error associated with the artificial intelligence agent.

2. The one or more non-transitory computer-readable media of claim 1, wherein the instructions for modifying the first portion of the request to be executed by the first domain-specific agent further cause the one or more processors to:

using the one or more deficient categories associated with the request, generate one or more sub-requests comprising the one or more portions of the request, with each portion corresponding to the deficient category of the one or more deficient categories, wherein a first sub-request of the one or more sub-requests comprises the first portion of the request; and transmit the one or more sub-requests to one or more domain-specific agents, wherein a subset of one or more sub-requests is transmitted to the first domain-specific agent.

3. The one or more non-transitory computer-readable media of claim 2, wherein each sub-request of the one or more sub-requests is associated with corresponding metadata indicating that an associated sub-request corresponds to at least one of the one or more deficient categories, and wherein each response to the one or more sub-requests replaces a corresponding portion of the request.

4. The one or more non-transitory computer-readable media of claim 1, wherein the instructions further cause the one or more processors to:

receive the response to the modified request executed by the artificial intelligence agent;

determine, using a machine learning model trained to measure a degree of accuracy of agent responses to requests, the accuracy parameter corresponding to the response to the modified request; and determine whether the accuracy parameter corresponding to the response meets the accuracy threshold.

5. The one or more non-transitory computer-readable media of claim 1, wherein the instructions further cause the one or more processors to:

add the request and the domain-specific response to a dataset for training the artificial intelligence agent, wherein the response is associated with the request within the dataset.

6. The one or more non-transitory computer-readable media of claim 1, wherein the instructions for generating the modified request further cause the one or more processors to:

based on the domain-specific response from the first domain-specific agent, generate response data corresponding to the one or more reasoning domain areas associated with the first portion of the request, wherein the response data includes structured data extracted from the domain-specific response from the first domain-specific agent.

7. The one or more non-transitory computer-readable media of claim 1, wherein the instructions further cause the one or more processors to:

receive the response to the modified request executed by the artificial intelligence agent;

determine, using a context similarity machine learning model, whether a response context of the response matches one or more bias contexts retrieved from a bias database, wherein the context similarity machine learning model is trained to measure a degree of context similarity between a particular bias context from the bias database and a particular response; and based on determining that the response context matches a bias context from the bias database, generate an indication of a bias detected within the response.

8. The one or more non-transitory computer-readable media of claim 7, wherein the instructions further cause the one or more processors to:

receive a user behavioral profile associated with a user that generated the request;

determine whether the bias detected within the response matches a user preferred bias within the user behavioral profile;

based on determining that the bias detected within the response does not match the user preferred bias within the user behavioral profile, modify the request with a set of instructions to the artificial intelligence agent to avoid the bias, wherein the set of instructions comprise the indication of the bias; and based on determining that the bias detected within the response matches the user preferred bias within the user behavioral profile, refrain from modifying the request.

9. A method comprising:

receiving a request comprising a prompt for generation of a response using an artificial intelligence agent deployed on a computing device;

determining, based on the request, a request context comprising a plurality of categorical parameters associated with the request;

comparing, using an artificial intelligence model, a behavioral profile associated with the artificial intelligence agent with the plurality of categorical parameters associated with the request to obtain one or more deficient categories associated with the request that correspond to one or more reasoning domain areas where an output of the artificial intelligence agent has been measured to have an agent output metric satisfying a threshold;

comparing a plurality of behavior profiles associated with a plurality of artificial intelligence agents with the one or more deficient categories;

determining, based on the comparing, that the one or more deficient categories are included in a first behavioral profile of a first domain-specific agent indicating that the first domain-specific agent is measured, based on an accuracy parameter meeting an accuracy threshold, to provide valid responses to the one or more deficient categories;

modifying, based on a reasoning domain area associated with a deficient category of the one or more deficient categories, a first portion of the request to be executed by the first domain-specific agent;

transmitting the first portion of the request to the first domain-specific agent to obtain a domain-specific response;

modifying the request to incorporate the domain-specific response, wherein the domain-specific response replaces one or more portions of the request corresponding to the one or more deficient categories to address the one or more deficient categories;

generating a modified request comprising a modified prompt for generating the response and comprising the domain-specific response from the first domain-specific agent as a replacement for the first portion of the request; and causing the modified request to be executed by the artificial intelligence agent deployed on the computing device, wherein execution of the modified request refines processing operations on the computing device for reducing a reasoning-error associated with the artificial intelligence agent.

10. The method of claim 9, wherein modifying the first portion of the request to be executed by the first domain-specific agent further comprises:

using the one or more deficient categories associated with the request, generating one or more sub-requests comprising the one or more portions of the request, with each portion corresponding to the deficient category of the one or more deficient categories, wherein a first sub-request of the one or more sub-requests comprises the first portion of the request; and transmitting the one or more sub-requests to one or more domain-specific agents, wherein a subset of one or more sub-requests is transmitted to the first domain-specific agent.

11. The method of claim 10, wherein each sub-request of the one or more sub-requests is associated with corresponding metadata indicating that an associated sub-request corresponds to at least one of the one or more deficient categories, and wherein each response to the one or more sub-requests replaces a corresponding portion of the request.

12. The method of claim 9, further comprising:

receiving the response to the modified request executed by the artificial intelligence agent;

determining, using a machine learning model trained to measure a degree of accuracy of agent responses to requests, the accuracy parameter corresponding to the response to the modified request; and determining whether the accuracy parameter corresponding to the response meets the accuracy threshold.

13. The method of claim 9, further comprising:

adding the request and the response to a dataset for training the artificial intelligence agent, wherein the response is associated with the request within the dataset.

14. The method of claim 9, further comprising:

based on the domain-specific response from the first domain-specific agent, generating response data corresponding to the one or more reasoning domain areas associated with the first portion of the request, wherein the response data includes structured data extracted from the domain-specific response from the first domain-specific agent.

15. The method of claim 9, further comprising:

receiving the response to the modified request executed by the artificial intelligence agent;

determining, using a context similarity machine learning model, whether a response context of the response matches one or more bias contexts retrieved from a bias database, wherein the context similarity machine learning model is trained to measure a degree of context similarity between a particular bias context from the bias database and a particular response; and based on determining that the response context matches a bias context from the bias database, generating an indication of a bias detected within the response.

16. The method of claim 15, further comprising:

receiving a user behavioral profile associated with a user that generated the request;

determining whether the bias detected within the response matches a user preferred bias within the user behavioral profile;

based on determining that the bias detected within the response does not match the user preferred bias within the user behavioral profile, modifying the request with a set of instructions to the artificial intelligence agent to avoid the bias, wherein the set of instructions comprise the indication of the bias; and based on determining that the bias detected within the response matches the user preferred bias within the user behavioral profile, refraining from modifying the request.

17. A system for testing and monitoring artificial intelligence agents, the system comprising:

one or more processors; and one or more non-transitory, computer-readable storage media storing instructions, which when executed by the one or more processors cause the one or more processors to perform operations comprising:

receiving a request comprising a prompt for generation of a response using an artificial intelligence agent deployed on a computing device;

determining, based on the request, a request context comprising a plurality of categorical parameters associated with the request, wherein the plurality of categorical parameters indicates one or more categories associated with the request, and wherein each category of the one or more categories is associated with a corresponding reasoning domain area of a plurality of reasoning domain areas;

comparing, using an artificial intelligence model, a behavioral profile associated with the artificial intelligence agent with the plurality of categorical parameters associated with the request to obtain one or more deficient categories associated with the request, wherein the one or more deficient categories of the request correspond to one or more reasoning domain areas where an output of the artificial intelligence agent has been measured to have an agent output metric satisfying a threshold;

comparing a plurality of behavior profiles associated with a plurality of artificial intelligence agents with the one or more deficient categories;

determining, based on the comparing, that the one or more deficient categories are included in a first behavioral profile of a first domain-specific agent indicating that the first domain-specific agent is measured, based on an accuracy parameter meeting an accuracy threshold, to provide valid responses to the one or more deficient categories;

modifying, based on a reasoning domain area associated with a deficient category of the one or more deficient categories, a first portion of the request to be executed by the first domain-specific agent, wherein the first portion of the request comprises a portion of the request related to the reasoning domain area associated with the deficient category;

transmitting the first portion of the request to the first domain-specific agent to obtain a domain-specific response;

modifying the request to incorporate the domain-specific response, wherein the domain-specific response replaces one or more portions of the request corresponding to the one or more deficient categories to address the one or more deficient categories;

generating a modified request comprising a modified prompt for generating the response and comprising the domain-specific response from the first domain-specific agent as a replacement for the first portion of the request; and causing the modified request to be executed by the artificial intelligence agent deployed on the computing device, wherein execution of the modified request refines processing operations on the computing device for reducing a reasoning-error associated with the artificial intelligence agent.

18. The system of claim 17, wherein modifying the first portion of the request to be executed by the first domain-specific agent further comprises:

using the one or more deficient categories associated with the request, generating one or more sub-requests comprising the one or more portions of the request, with each portion corresponding to the deficient category of the one or more deficient categories, wherein a first sub-request of the one or more sub-requests comprises the first portion of the request; and transmitting the one or more sub-requests to one or more domain-specific agents, wherein a subset of one or more sub-requests is transmitted to the first domain-specific agent.

19. The system of claim 18, wherein each sub-request of the one or more sub-requests is associated with corresponding metadata indicating that an associated sub-request corresponds to at least one of the one or more deficient categories, and wherein each response to the one or more sub-requests replaces a corresponding portion of the request.

20. The system of claim 17, further comprising:

receiving the response to the modified request executed by the artificial intelligence agent;

determining, using a machine learning model trained to measure a degree of accuracy of agent responses to requests, the accuracy parameter corresponding to the response to the modified request; and determining whether the accuracy parameter corresponding to the response meets the accuracy threshold.

* * * * *